US011132290B2

(12) United States Patent
Gschwind

(10) Patent No.: US 11,132,290 B2
(45) Date of Patent: Sep. 28, 2021

(54) LOCALITY DOMAIN-BASED MEMORY POOLS FOR VIRTUALIZED COMPUTING ENVIRONMENT

(71) Applicant: INTERNATIONAL BUSINESS MACHINES CORPORATION, Armonk, NY (US)

(72) Inventor: Michael K. Gschwind, Chappaqua, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 190 days.

(21) Appl. No.: 16/429,291

(22) Filed: Jun. 3, 2019

(65) Prior Publication Data

US 2019/0286553 A1    Sep. 19, 2019

Related U.S. Application Data

(63) Continuation of application No. 15/807,957, filed on Nov. 9, 2017, now Pat. No. 10,552,309.

(51) Int. Cl.
*G06F 12/00* (2006.01)
*G06F 12/02* (2006.01)
(Continued)

(52) U.S. Cl.
CPC ........ *G06F 12/023* (2013.01); *G06F 12/1045* (2013.01); *G06F 13/1663* (2013.01);
(Continued)

(58) Field of Classification Search
None
See application file for complete search history.

(56) References Cited

U.S. PATENT DOCUMENTS 5,784,697 A  7/1998 Funk et al.
6,289,424 B1  9/2001 Stevens
(Continued)

FOREIGN PATENT DOCUMENTS

CN   106293881 A   1/2017

OTHER PUBLICATIONS

Brock, et al., "Windows NT in a ccNUMA System", Proc. of the 3rd UNISEX Windows NT Symposium : 61-72, 147, UNISEX, 1999 (12 pages).
(Continued)

*Primary Examiner* — Daniel D Tsui
(74) *Attorney, Agent, or Firm* — Steven Chiu, Esq.; Kevin P. Radigan, Esq.; Heslin Rothenberg Farley & Mesiti P.C.

(57) ABSTRACT

Processing within a non-uniform memory access (NUMA) computing environment is facilitated by obtaining memory for a memory heap for an application of a virtualized environment of the NUMA computing environment, and assigning portions of memory of the obtained memory to locality domain-based freelists. The assigning including obtaining, for a selected portion of memory of the portions of memory, a locality domain within the NUMA computing environment with which the portion of memory is associated, and adding the selected portion of memory to a corresponding locality domain-based freelist of the locality domain-based freelists based on the associated locality domain of the portion of memory. Domain locality is then used in allocating the memory from the locality domain-based freelists to processors of the NUMA computing environment performing processing of the application.

19 Claims, 29 Drawing Sheets

(51) Int. Cl.
  *G06F 13/16* (2006.01)
  *G06F 12/1045* (2016.01)
(52) U.S. Cl.
  CPC .............. *G06F 2212/1044* (2013.01); *G06F 2212/2542* (2013.01); *G06F 2212/65* (2013.01)

(56) References Cited

U.S. PATENT DOCUMENTS

| | | | |
|---|---|---|---|
| 6,363,410 | B1 | 3/2002 | Kanamori et al. |
| 6,546,546 | B1 | 4/2003 | Van Doorn et al. |
| 7,185,167 | B2 | 2/2007 | Sollich |
| 7,389,506 | B1 | 6/2008 | Miller et al. |
| 7,512,745 | B2 | 3/2009 | Gschwind et al. |
| 7,577,813 | B2 | 8/2009 | Nijhawan et al. |
| 7,716,258 | B2 | 5/2010 | Dussud |
| 7,962,707 | B2 | 6/2011 | Kaakani et al. |
| 8,200,718 | B2 | 6/2012 | Roberts |
| 8,312,219 | B2 | 11/2012 | Cher et al. |
| 8,738,859 | B2 | 5/2014 | Cher et al. |
| 8,788,739 | B2 | 7/2014 | Chang et al. |
| 8,797,332 | B2 | 8/2014 | Blinzer et al. |
| 8,943,108 | B2 | 1/2015 | Allen et al. |
| 9,268,595 | B2 | 2/2016 | Chen et al. |
| 10,223,282 | B2 | 3/2019 | Patel et al. |
| 2003/0009643 | A1 | 1/2003 | Armilli et al. |
| 2006/0259704 | A1 | 11/2006 | Wyman |
| 2008/0140738 | A1 | 6/2008 | Blandy et al. |
| 2010/0211756 | A1 | 8/2010 | Kaminski et al. |
| 2011/0252199 | A1 | 10/2011 | Serrano et al. |
| 2012/0102258 | A1 | 4/2012 | Hepkin et al. |
| 2012/0254266 | A1 | 10/2012 | Printezis et al. |
| 2014/0101209 | A1 | 4/2014 | Hunt et al. |
| 2014/0115291 | A1 | 4/2014 | Caspole |
| 2014/0207871 | A1 | 7/2014 | Miloushev et al. |
| 2014/0244891 | A1 | 8/2014 | Tsirkin et al. |
| 2014/0245295 | A1 | 8/2014 | Tsirkin et al. |
| 2014/0282530 | A1 | 9/2014 | Aslot et al. |
| 2015/0370732 | A1 | 12/2015 | Tanimoto |
| 2016/0117172 | A1 | 4/2016 | Alexander et al. |
| 2017/0289036 | A1 | 10/2017 | Vasudevan |
| 2019/0138219 | A1 | 5/2019 | Gschwind et al. |
| 2019/0138436 | A1 | 5/2019 | Gschwind et al. |
| 2019/0138441 | A1 | 5/2019 | Gschwind et al. |

OTHER PUBLICATIONS

International Business Machines Corporation (IBM), "Automatic, Scalable, and Memory Minimizing Object Pool", IPCOM000124897D, May 11, 2005 (4 pages).
International Business Machines Corporation (IBM), "Memory Segmentation to Optimize Page Replacement Algorithm", IPCOM000126681D, Jul. 28, 2005 (2 pages).
Broquedis, et al., "hwloc: A Generic Framework for Managing Hardware Affinities in HPC Applications", IEEE. PDP 2010—the 18th Euromicro International Conference on Parallel, Distributed and Network-Based Computing, Feb. 2010, Pisa Italy (9 pages).
Ribeiro, Christine P., "Contributions on Memory Affinity Management for Hierarchical Shared Memory Multi-core Platforms", Dissertation, University of Grenoble, Jun. 29, 2011 (223 pages).
Mel, et al., "The NIST Definition of Cloud Computing," National Institute of Standards and Technology, Information Technology Laboratoy, Special Publication 800-145, Sep. 2011, (pp. 1-7).
Ding, et al., "Locality-Aware Mapping and Scheduling for Multicores", CGO '13, Feb. 2013, IEEE (12 pages).
International Business Machines Corporation (IBM) , "Garbage Collection Teaching Using Locality for Improved Performance", IPCOM000226571D, Apr. 16, 2013 (3 pages).
Mavridis, et al., "Jericho: Achieving Scalability Through Optimal Data Placement on Multicore Systems", MSST, IEEE, 2014 (10 pages).
International Business Machines Corporation (IBM), "z/Architecture Principles of Operation," IBM® Publication No. SA22-7382-10, Eleventh Edition, Mar. 2015, (pp. 1-1732).
International Business Machines Corporation (IBM), "Power ISA™ Version 2.07B," Apr. 9, 2015, (pp. 1-1527).
Gschwind, Michael K., "Facilitating Access to Memory Locality Domain Information", U.S. Appl. No. 16/427,595, filed May 31, 2019 (92 pages).
Gschwind et al., "List of IBM Patents and/or Patent Applications Treated as Related", U.S. Appl. No. 16/429,291, filed Jun. 3, 2019 (2 pages).
Zhou et al., "Memory Management for Many-Core Processors with Software Configurable Locality Policies", ISMM 12, Beijing, China, Jun. 15-16, 2012 (pp. 3-14).
Lim et al., "MICA: A Holistic Approach to Fast In-Memory Key-Value Storage", NSDI '14, Seattle, WA, USA, Apr. 2-4, 2014 (17 pages).
Alnowaiser, K., "A Study of Connected Object Locality in NUMA Heaps", MSPC '14, Edinburgh, Scotland, UK, Jun. 2014 (9 pages).
Gidra et al., "NumaGiC: A Garbage Collector for Big Data on Big NUMA Machines", ASPLOS '15, Istanbul, Turkey, Mar. 14-18, 2015 (pp. 661-673).
Kaiser et al., "Higher-Level Parallelization for Local and Distributed Asynchronous Task-Based Programming", ESPM2 2015, Austin, TX, USA, Nov. 15-20, 2015 (pp. 29-37).
Wikipedia, "Non-Uniform Memory Access", downloaded from: https://en.wikipedia.org/wiki/Non-uniform_memory_access on Oct. 28, 2019 (pp. 1-3).
Herlihy, Maurice P., et al., "Lock-Free Garbage Collection for Multiprocessors", IEEE Transactions on Parallel and Distributed Systems. vol. 3, No. 3, May 1992, pp. 304-311.
Auhagen, Sven, et al., "Garbage Collection for Multicore NUMA Machines", MSPC'11, San Jose, CA, Jun. 5, 2011, pp. 51-57.

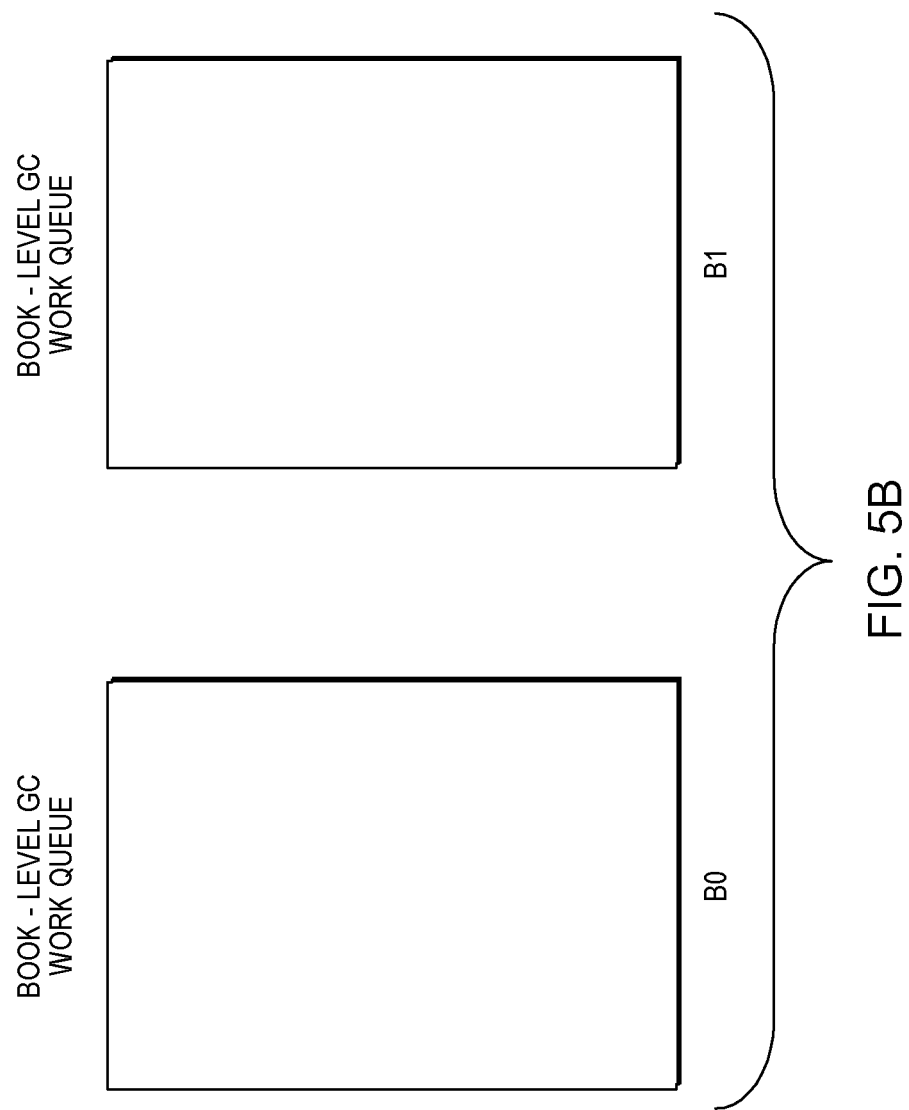

1918 — WHERE THE UNITS OF MEMORY ARE MEMORY PAGES

1920 — WHERE THE OBTAINING MEMORY INCLUDES RECEIVING A VIRTUALIZED MEMORY RANGE FOR THE MEMORY HEAP AND SEPARATING THE VIRTUALIZED MEMORY RANGE INTO THE PORTIONS OF MEMORY BASED ON LOCALITY DOMAINS WITHIN THE NUMA COMPUTING ENVIRONMENT WITH WHICH THE PORTIONS OF MEMORY ARE ASSOCIATED, THE ASSOCIATED LOCALITY DOMAINS BEING OBTAINED VIA, IN PART, ADDRESS TRANSLATION

1922 — WHERE THE PORTIONS OF MEMORY INCLUDE UNITS OF MEMORY, AND THE METHOD FURTHER INCLUDES:

PERFORMING GARBAGE COLLECTION PROCESSING WITHIN THE NUMA COMPUTING ENVIRONMENT, THE GARBAGE COLLECTION PROCESSING INCLUDING PERFORMING MEMORY COMPACTION; AND

DETERMINING AFTER THE MEMORY COMPACTION A LOCALITY DOMAIN WITHIN THE NUMA COMPUTING ENVIRONMENT WITH WHICH A UNIT OF MEMORY OF THE UNITS OF MEMORY IS ASSOCIATED

1924 — WHERE THE DETERMINING INCLUDES ASCERTAINING THE LOCALITY DOMAIN WITHIN THE NUMA COMPUTING ENVIRONMENT WITH WHICH THE UNIT OF MEMORY IS NOW ASSOCIATED, AND ADDING THAT UNIT OF MEMORY TO THE CORRESPONDING LOCALITY DOMAIN-BASED FREELIST

1926 — WHERE THE DETERMINING INCLUDES ASCERTAINING A LOCALITY DOMAIN WITHIN THE NUMA COMPUTING ENVIRONMENT FROM WHICH THE UNIT OF MEMORY IS MOST ACCESSED AND ADDING THAT UNIT OF MEMORY TO THE CORRESPONDING LOCALITY DOMAIN-BASED FREELIST OF THAT DOMAIN

1928 — FURTHER, IN ASSOCIATION WITH DEALLOCATING A PORTION OF MEMORY, OBTAINING FOR THE DEALLOCATED PORTION OF MEMORY THE LOCALITY DOMAIN WITHIN THE NUMA COMPUTING ENVIRONMENT WITH WHICH THE DEALLOCATED PORTION OF MEMORY IS ASSOCIATED, AND ADDING THE DEALLOCATED PORTION OF MEMORY TO THE CORRESPONDING LOCALITY DOMAIN-BASED FREELIST

FIG. 19B

LOCALITY DOMAIN-BASED MEMORY POOLS FOR VIRTUALIZED COMPUTING ENVIRONMENT

BACKGROUND

In a non-uniform memory access (NUMA) system, processors are typically distributed across books (such as boards or drawers), with each book including one or more processor connected memory local to the book. The books are interconnected by a network so that processors on one book can also access memory on other books.

Processors in NUMA systems can access local memory quickly and efficiently. However, when a processor needs to access remote memory on a different book, there is delay, which is known as latency. There are also bandwidth issues over the network that interconnects the books.

SUMMARY

Shortcomings of the prior art are overcome and additional advantages are provided through the provision of a computer program product for facilitating processing within a non-uniform memory access (NUMA) computing environment. The computer program product includes a computer readable storage medium readable by a processing circuit and storing instructions which, when executed, perform a method. The method includes, for instance, obtaining memory for a memory heap for an application of a virtualized environment of the NUMA computing environment, and assigning portions of memory of the obtained memory to locality domain-based freelists. The assigning includes obtaining, for a selected portion of memory of the portions of memory, a locality domain within the NUMA computing environment with which the portion of memory is associated, and adding the portion of memory to a corresponding locality domain-based freelist of the locality domain-based freelists based on the associated locality domain of the portion of memory. Further, the method includes using locality domain in allocating the memory from the locality domain freelists to processors of the NUMA computing environment performing processing of the application. The use of locality domain-based freelists from which to allocate memory to processors of the NUMA computing environment advantageously facilitates processing and improved performance within the computing environment by reducing delays and bandwidth issues between the processors and memory.

In one or more embodiments, the portions of memory include units of memory, and the using domain locality includes accessing a locality domain freelist of the locality domain-based freelists corresponding to a current physical processor locality domain within the NUMA computing environment to obtain a unit of memory, the current processor requesting a memory allocation in connection with processing of the application. Further, based on the accessing, one or more embodiments may include confirming that the obtained unit of memory remains in the locality domain of the current physical processor in association with allocating the unit of memory to the current physical processor. In one example, based on the obtained unit of memory now being associated with a different locality domain, the method may include reallocating the obtained unit of memory to another locality domain freelist corresponding to the different locality domain, and obtaining another unit of memory from the locality domain-based freelist corresponding to the current physical processor's locality domain. In one or more implementations, the units of memory are memory pages.

In one or more embodiments, the obtaining memory may include receiving a virtualized memory range for the memory heap and separating the memory range into the portions of memory based on locality domains within the NUMA computing environment with which the portions of memory are associated. The associated locality domains are obtained via, in part, address translation.

In one or more implementations, the portions of memory include units of memory, and the method further includes performing garbage collection processing within the NUMA computing environment, the garbage collection processing including performing memory compaction, and determining after the memory compaction a locality domain within the NUMA computing environment with which the unit of memory of the units of memory is associated. In one example, the determining may include ascertaining the locality domain within the NUMA computing environment with which the unit of memory is now associated, and adding that unit of memory to the corresponding locality domain-based freelist. Further, in one example, the determining may include ascertaining a locality domain within the NUMA computing environment from which the unit of memory is most accessed, and adding that unit of memory to the corresponding locality domain freelist of that domain.

In one or more embodiments, the method may further include, in association with deallocating a portion of memory, obtaining for the deallocated portion of memory the locality domain within the NUMA computing environment with which the deallocated portion of memory is associated, and adding the deallocated portion of memory to the corresponding locality domain-based freelist.

Computer systems and computer-implemented methods relating to one or more aspects are also described and claimed herein. Further, services relating to one or more aspects are also described and may be claimed herein.

Additional features and advantages are realized through the techniques of the present invention. Other embodiments and aspects of the invention are described in detail herein and are considered a part of the claimed invention.

BRIEF DESCRIPTION OF THE DRAWINGS

One or more aspects of the present invention are particularly pointed out and distinctly claimed as examples in the claims at the conclusion of the specification. The foregoing and other objects, features, and advantages of the invention are apparent from the following detailed description taken in conjunction with the accompanying drawings in which:

FIGS. 5A & 5B depict alternate implementations of garbage collection work queues in a computing environment to incorporate and use one or more aspects of the present invention;

FIGS. 19A-19B depict one embodiment of facilitating processing within a computing environment, in accordance with one or more aspects of the present invention;

DETAILED DESCRIPTION

Figure 1A:
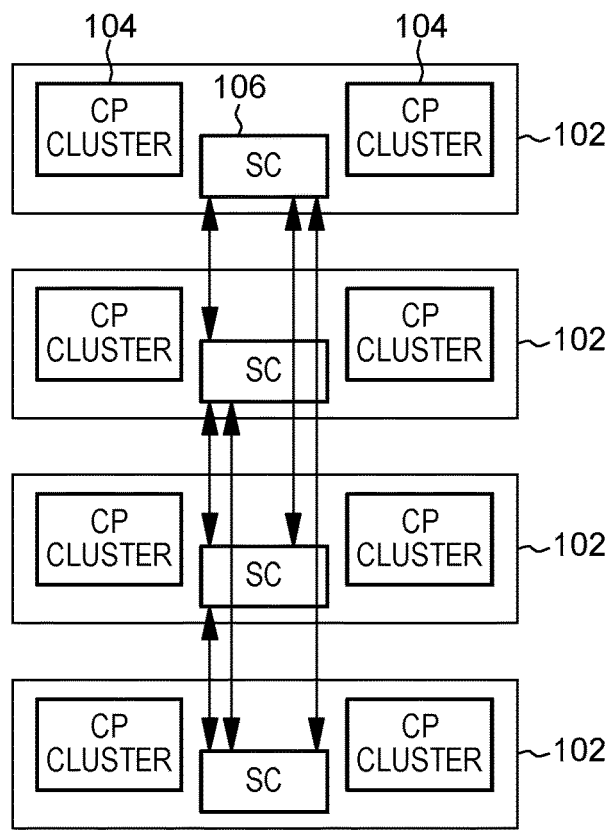
FIG. 1A depicts one example of a computing environment to incorporate and use one or more aspects of the present invention.

Aspects of the present invention and certain features, advantages and details thereof, are explained more fully below with reference to the non-limiting example(s) illustrated in the accompanying drawings. Descriptions of well-known computing systems, devices, processing techniques, etc., are omitted so as to not unnecessarily obscure the invention in detail. It should be understood, however, that the detailed description and the specific example(s), while indicating aspects of the invention, are given by way of illustration only, and not by way of limitation. Various substitutions, modifications, additions, and/or rearrangements, within the spirit and/or scope of the underlying inventive concepts will be apparent to those skilled in the art from this disclosure. Note further that numerous inventive aspects and features are disclosed herein, and unless inconsistent, each disclosed aspect or feature is combinable with any other disclosed aspect or feature as desired by a particular application, for instance, for facilitating processing within a computing environment, such as facilitating affinity-domain-based processing within a computing environment.

The illustrative embodiments may be described using specific code, designs, architectures, protocols, layouts, schematics, or tools by way of example only, and not by way of limitation. Further, the illustrative embodiments are described in some instances using particular software, tools, and data processing environments only as an example for clarity of description. The illustrative embodiments may be used in conjunction with other comparable or similarly purposed structures, systems, applications, or architectures. An illustrative embodiment may be implemented in hardware, software, or a combination thereof.

The examples in this disclosure are used only for clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed herein.

Garbage collection is an automatic memory management process that identifies data units, such as objects, in memory that are no longer being referenced and frees those objects. To detect unused memory, a garbage collection process typically scans the set of dynamically allocated data items, or heap, and identifies for each memory location whether any use of that location is detectable anywhere in the application's memory. Garbage collection may take a significant proportion of total processing time in a program, and as a result, can have significant influence on performance. Further, a garbage collection memory scan can lead to undesirable long pauses of the actual application program (the "mutator"). This can be amplified even more in certain system architectures, such as a non-uniform memory access architecture common in today's server designs, where subsets of memory locations are faster for one set of processors than for another set of processors.

Therefore, in accordance with one or more aspects, a capability is provided to facilitate affinity-domain-based garbage collection. In one or more implementations, affinitized garbage collection processing is disclosed herein based on address derived affinity.

One example of a computing environment to incorporate and use one or more aspects of the present invention is initially described with reference to FIG. 1A. In one example, a computing environment 100 is based on the z/Architecture®, offered by International Business Machines Corporation, Armonk, N.Y., USA. One embodiment of the z/Architecture is described in "z/Architecture Principles of Operation," IBM Publication No. SA22-7832-10, March 2015, which is hereby incorporated herein by reference in its entirety. Note that Z/ARCHITECTURE® is a registered trademark of International Business Machines Corporation, Armonk, N.Y., USA.

In another example, the computing environment may be based on the Power Architecture®, offered by International Business Machines Corporation, Armonk, N.Y. One embodiment of the Power Architecture is described in "Power ISA™ Version 2.07B," International Business Machines Corporation, Apr. 9, 2015, which is hereby incorporated herein by reference in its entirety. Note further that POWER ARCHITECTURE® is a registered trademark of International Business Machines Corporation, Armonk, N.Y., USA.

The computing environment may also be based on other architectures, including, but not limited to, the Intel x86 architectures. Other examples also exist.

In one example, computing environment 100 includes a plurality of books (i.e., drawers, boards, etc.) 102. A book includes one or more central processing (CP) clusters 104 (also referred to as nodes) and a system controller (SC) 106 (e.g., SC chip). The system controller interconnects books 102, and may be separate from and/or part of one or more of the CP clusters. Further details regarding book 102 are described with reference to FIG. 1B.

As shown, in one example, book 102 includes a plurality of (e.g., 2) central processing clusters 104. A central processing cluster 104 includes a plurality of central processor chips 110, each of which is coupled to system controller 106. A central processor chip 110 includes one or more cores 120 (also referred to as processors or central processing units (CPUs)), such as, e.g., eight cores per chip. Moreover, in one example, central processor chip 110 is coupled to, e.g., one or more dual in-line memory modules (DIMMs) 122 providing memory for use by CP cluster 104.

Figure 2:
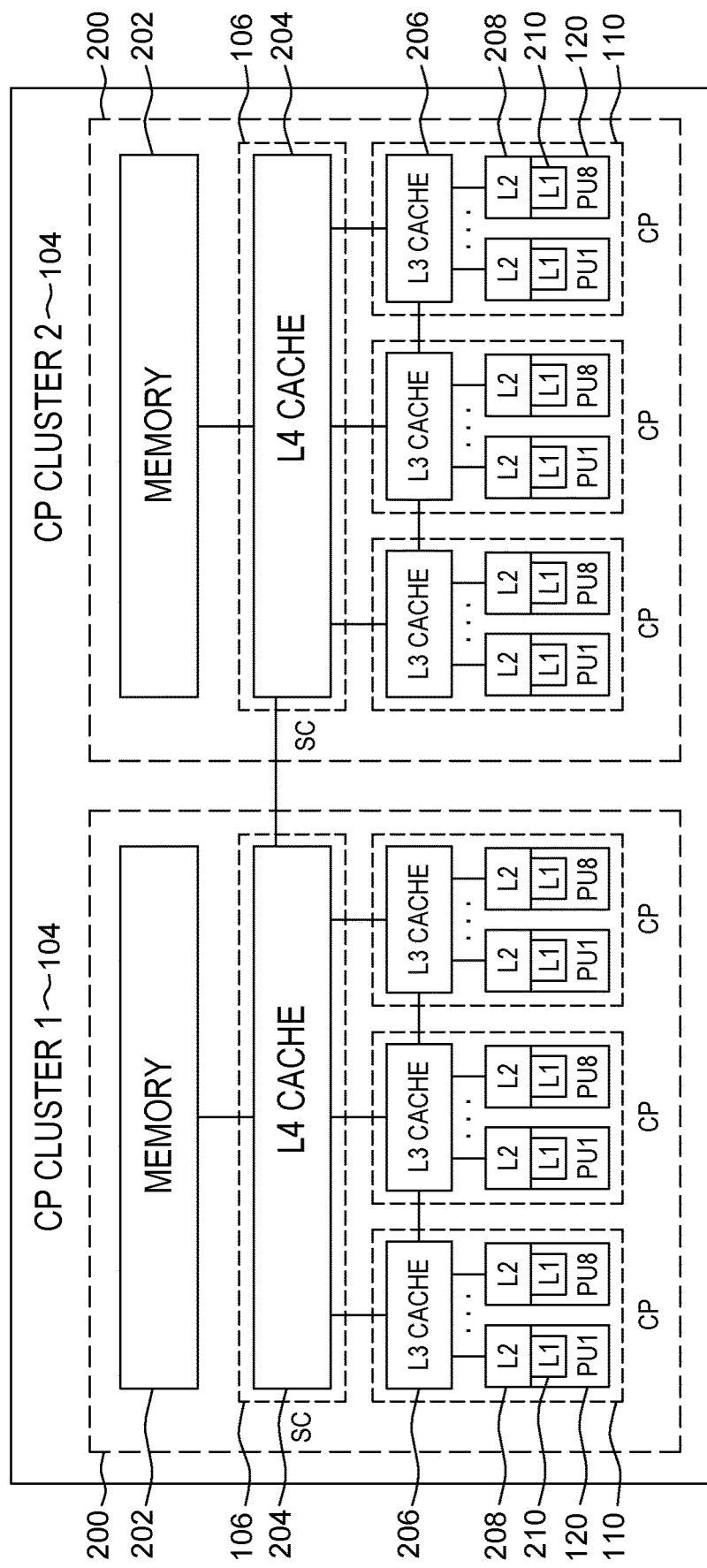
FIG. 2 depicts one example of a memory hierarchy of a book of FIG. 1A, in accordance with one or more aspects of the present invention.

CP cluster 104 uses main memory, as well as memory caches, to facilitate processing. One example of a memory hierarchy employed by CP cluster 104 is described with reference to FIG. 2. In one example, a memory hierarchy 200, includes a main memory 202; a shared L4 cache 204; one or more shared L3 caches 206; one or more private L2 caches 208; and one or more private L1 caches 210 in a processor 120. In this example implementation, L4 cache 204 is part of system controller 106, which provides connectivity to the other books. Although an example memory hierarchy is described herein, other examples are possible.

Figure 3:
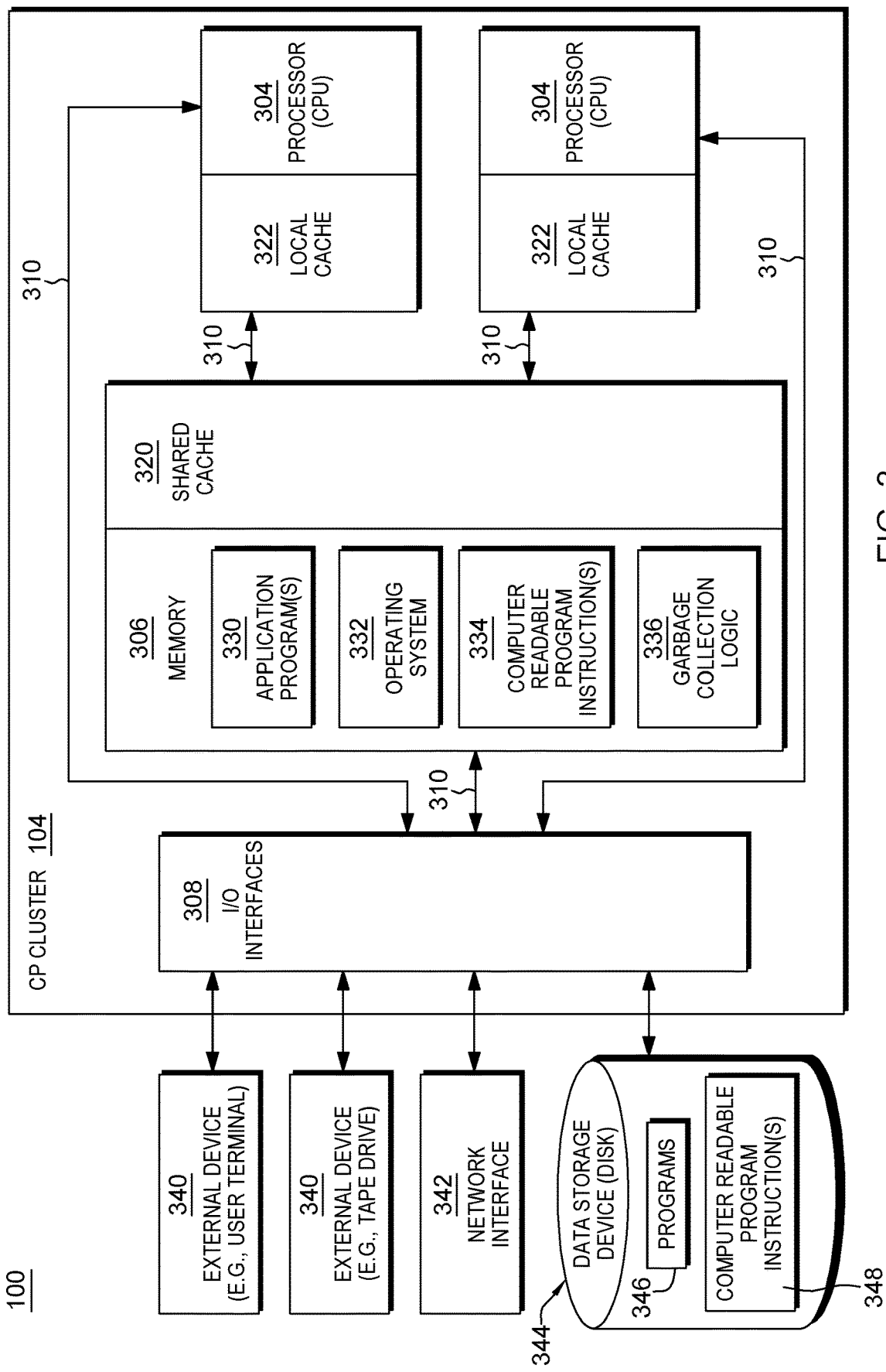
FIG. 3 depicts further details of a computing environment to incorporate and use one or more aspects of the present invention.

Further details regarding one example of CP cluster 104 are described with reference to FIG. 3. CP cluster 104 is shown, in one example, in the form of a general-purpose computing device. CP cluster 104 may include, but is not limited to, one or more processors or processing units 304 (e.g., core 120), a memory 306 (referred to as main memory or storage, as examples; e.g., memory 202), and one or more input/output (I/O) interfaces 308, coupled to one another via one or more buses and/or other connections 310.

Bus 310 represents one or more of any of several types of bus structures, including a memory bus or memory controller, a peripheral bus, an accelerated graphics port, and a processor or local bus using any of a variety of bus architectures. By way of example, and not limitation, such architectures include the Industry Standard Architecture (ISA), the Micro Channel Architecture (MCA), the Enhanced ISA (EISA), the Video Electronics Standards Association (VESA) local bus, and the Peripheral Component Interconnect (PCI).

Memory 306 may include and/or be coupled to, for instance, a cache 320, such as a shared cache (e.g., L4 cache 204 and/or L3 cache 206), which may be coupled to local caches 322 (e.g., L2 cache 208 and/or L1 cache 210) of processors 304 as part of a cache hierarchy that includes a complex system of buses interconnecting the processors, the chips, the CP clusters and one or more memory controllers in a multi-book system. Further, memory 306 may include one or more programs or applications 330, an operating system 332, and one or more computer readable program instructions 334, as well as garbage collection logic 336 or instructions. In one or more embodiments, computer readable program instructions 334 may be configured to carry out functions of embodiments of aspects of the invention.

CP cluster 104 may also communicate via, e.g., I/O interfaces 308 with one or more external devices 340, one or more network interfaces 342, and/or one or more data storage devices 344. Example external devices include a user terminal, a tape drive, a pointing device, a display, etc. Network interface 342 enables CP cluster 104 to communicate with one or more networks, such as a local area network (LAN), a general wide area network (WAN), and/or a public network (e.g., the Internet), providing communication with other computing devices or systems.

Data storage device 344 may store one or more programs 346, one or more computer readable program instructions 348, and/or data, etc. The computer readable program instructions may be configured to carry out functions of embodiments of aspects of the invention.

CP cluster 104 may include and/or be coupled to removable/non-removable, volatile/non-volatile computer system storage media. For example, it may include and/or be coupled to a non-removable, non-volatile magnetic media (typically called a "hard drive"), a magnetic disk drive for reading from and writing to a removable, non-volatile magnetic disk (e.g., a "floppy disk"), and/or an optical disk drive for reading from or writing to a removable, non-volatile optical disk, such as a CD-ROM, DVD-ROM or other optical media. It should be understood that other hardware and/or software components could be used in conjunction with CP cluster 104. Examples, include, but are not limited to: microcode, device drivers, redundant processing units, external disk drive arrays, RAID systems, tape drives, and data archival storage systems, etc.

CP cluster 104 may be operational with numerous other general purpose or special purpose computing system environments or configurations. Examples of well-known computing systems, environments, and/or configurations that may be suitable for use with CP cluster 104 include, but are not limited to, personal computer (PC) systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed cloud computing environments that include any of the above systems or devices, and the like.

Figure 1B:
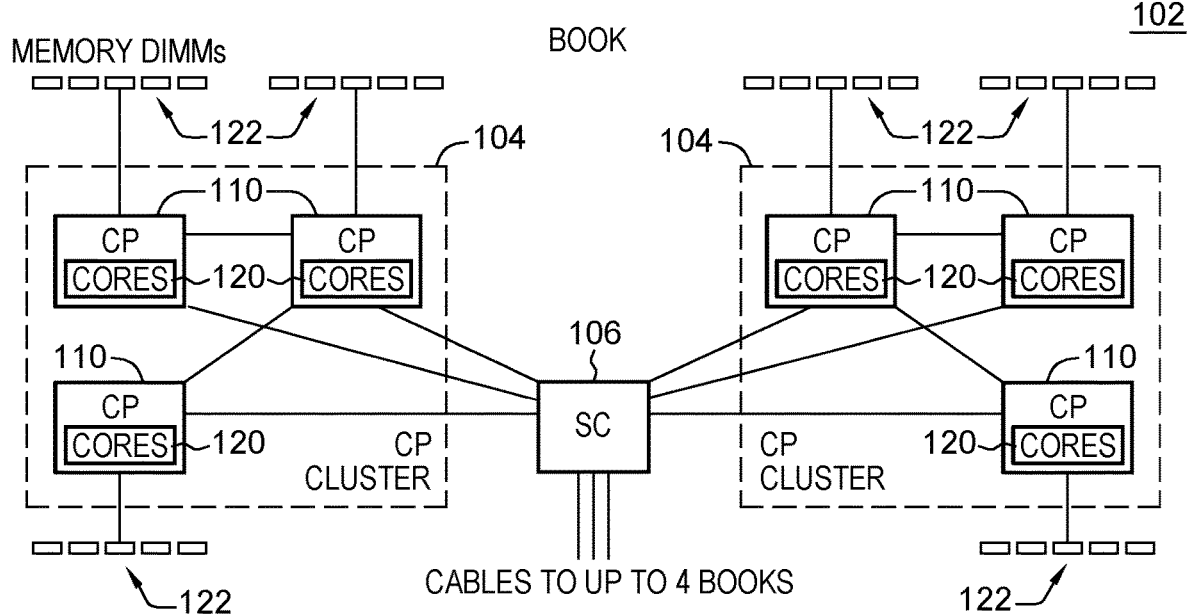
FIG. 1B depicts further details of a book (such as a drawer, board, server, etc.) of FIG. 1A, in accordance with one or more aspects of the present invention.

The computing environment described above in connection with FIGS. 1A-3 is one example of a non-uniform memory access (NUMA) computing environment or system. Non-uniform memory access (NUMA) is a computer memory design used in multiprocessing, where the memory access time depends on the memory location relative to the processor. Under NUMA, a processor can access the processor's own local memory faster than non-local memory (i.e., memory local to another processor or memory shared between processors). In such a computing environment, all NUMA memory is accessed in a single, common global address space by the processors in the system, irrespective of whether the memory is local memory or non-local memory to a particular processor. As explained above, in a NUMA computing environment, processors are distributed across books (e.g., drawers or boards), and each book may include one or more processor connected memory local to that book. The books are interconnected by a network as illustrated in FIGS. 1A & 1B so that processors on one book can access memory on other books. As noted, garbage collection within such computing environments may be time consuming, and have a significant influence on system performance. Also as noted, a memory scan as part of a garbage collection process can be computationally expensive, potentially leading to undesirable long pauses of the actual application program (the "mutator"). This can be amplified in computing environments such as a non-uniform memory access system common in today's server designs, where subsets of memory locations are faster to one set of processors than for other sets of processors. As disclosed herein, it is therefore desirable to perform the memory scan of the application heap for each set of memory locations with the processor(s) which has the fastest access to those memory locations, where possible.

One approach to such affinitized garbage collection would be to allocate heap memory for each software execution thread from a memory pool known to be closely connected to a specific processor core, and binding the software thread to a hardware execution thread on the same core. Disadvantageously, such an organization would require significant invasive changes in the software stack. For instance, it would require an ability to request memory allocation in a memory attached to a specific processor, including appropriate requests from an application to the operating system, and further from an operating system to the hypervisor. Also, it would require binding of memory so allocated to processor nodes, that is, when a processor pages out memory and later pages in memory, page-in happens to memory allocated to the same processor as originally requested. Further, it would require binding of a software thread to a hardware processor, so that once memory has been allocated that is attached to a processor, execution continues to reside on that core, limiting scheduling freedom for both operating system and hypervisor. With such an architecture, for a number of threads T(N), there are allocated heaps H(T(n)) and each thread T(n) application allocates heap memory from H(T(n)), and when garbage collection is performed, a garbage collection worker thread allocated to T(n) performs the scan of the heap. Unfortunately, such an approach would be undesirably restrictive in the ability to allocate memory freely, to allocate execution threads freely, and overly invasive in terms of requiring changes to system interfaces, resulting in both reduced system efficiency, as well as an inability to apply such affinitized garbage collection processing to legacy systems. Therefore, a different approach is desired for performing more efficient garbage collection, such as in legacy systems, while also preserving the freedom for operating system and hypervisor to make efficient resource allocation decisions.

Advantageously, disclosed herein is an affinitized garbage collection process based on address-derived affinity. In accordance with one or more aspects, a method, system and computer program product are provided for facilitating allocating garbage collection operations to a processor(s) that is most closely coupled to the memory region on which the garbage collection operations are allocated (also referred to herein as the affinity domain of the processor). Note that in the description provided herein, locality domain, affinity domain, or domain, may be used interchangeably. In one or more embodiments, the locality domain may have a plurality of memory locations, units, etc., and be a domain that has, for instance, a common access characteristic or characteristics, for example, with respect to access performance or latency relative to one or more processors. In one or more implementations, a locality domain may be identified by a number or description. Depending on the discussion, locality domain may also mean the particular memory that is most local to a particular processor or set of processors.

By way of example, and as explained further herein, the affinitized garbage collection process may include determining what affinity or locality domain a memory region is allocated, and based on the determined locality domain, a test may be performed to determine whether the locality domain corresponds to the locality domain of a specific (e.g., present) processor being considered. Based on the locality domains matching, a garbage collection operation is initiated (or indicated to be initiated) on that specific processor (either immediately or by queuing the garbage collection operation in a work queue (e.g., garbage collection work queue) for that specific processor). Otherwise, the memory region may be scanned by another processor which has the matching locality domain, and not scanned by the specific (e.g., the current) processor.

A variety of embodiments are discussed herein. In one embodiment, a unified work queue reflective of legacy garbage collection work queues is discussed. A determination may be made when an element is obtained by a specific processor, and the work is skipped when it does not correspond to the work domain of the specific processor. In another embodiment, a determination may be made at the time of enqueuing operations. A variety of hardware embodiments may also be used upon which to base the locality domain of a memory region. In one embodiment, a hardware embodiment, provides a test "is this region (or location, or page, etc.) on the present processor?" In a further embodiment, hardware may provide an instruction returning the specific locality domain of a region. Embodiments of garbage collection thread localization by garbage collection service steering are also described herein.

As noted, garbage collection accesses large volumes of data to scan memory for reusable memory. As an example, in an IBM system z/architecture, the latency for at least one level of system architecture (i.e., book level) may be significantly non-uniform, making it desirable to perform garbage collection scanning and compacting on a book-local processor. Currently, in the system z/architecture, there is no mechanism to request allocation of memory from a specific book's memory, making it difficult to associate memory with a specific book. Thus, disclosed herein are methods, systems and computer program products which allow the benefits of local garbage collection scanning and compacting available in a system where the hypervisor and operating system do not provide an interface to applications to allocate multiple blocks on selected locality domains.

The mark-and-sweep garbage collection algorithm embodies one approach to garbage collection. With this algorithm, pointers are explored starting from the program variables, and all records encountered are marked. A sweep is then made through all records in the heap and any unmarked records are reclaimed, and all marked records are marked unmarked. The assumption with the approach is that the size of each record is known, the fields that are pointers are known, and reclaimed records are kept in a freelist.

As a specific example only, the Boehm-Demers-Weiser (BDW) mark-and-sweep garbage collector is a popular garbage collector due to its portability and language independence. It optimizes a class of garbage collectors known as ambiguous roots garbage collectors. Such garbage collectors are available to forego precise information about roots and knowledge of the layouts of objects by assuming that any word-sized value is a potential application memory heap reference. Any value that ambiguously appears to refer to the application memory heap, while perhaps simply having a value that looks like an application memory heap reference, is treated as a memory reference and the object to which it refers is considered to be "live," i.e., not a candidate for garbage collection. The ambiguously-referenced object cannot move since their ambiguous roots cannot be overwritten with a new address of the object, i.e., if the ambiguous value is not really a memory reference, but merely looks like a memory reference, it still should not be modified. The BDW garbage collector treats registers, static areas, and thread activation stacks ambiguously. If object layout information is available, such as from the application programmer or compiler, then the BDW garbage collector can make use of it, but otherwise, values contained in objects are also treated ambiguously.

The advantage of ambiguous roots garbage collectors is in their independence of the application programming language and compiler. The BDW garbage collectors support garbage collection for applications coded in C and C++, which preclude accurate garbage collection because they are not data type-safe. BDW is also often used with data type-safe languages whose compilers do not provide the precise information necessary to support accurate garbage collection. The minimum requirement is that the source program not hide memory references from garbage collection and that compilers not perform transformations that hide memory references from garbage collection. Thus, BDW garbage collection is used in more diverse settings than perhaps any other garbage collector. As a result, the BDW garbage collector has been heavily tuned, both for basic performance, and to minimize the negative impact of ambiguous roots.

Note that the above-discussed BDW mark-and-sweep garbage collector is presented by way of nonlimiting example. A variety of garbage collectors, including other mark-and-sweep collectors, as well as other garbage collection approaches, such as copy-based collectors, or generational collectors, can be practiced in conjunction with the embodiments disclosed herein. Generally stated, disclosed herein in one or more aspects, is a process which includes deciding to perform work locally, and either accessing or maintaining work units to be performed by a collector by, for instance, processor affinity.

The basic structure of mark-and-sweep garbage collection, such as implemented by the BDW garbage collector, is depth first searching of all reachable pointers on an application memory heap. For this purpose, an initial set of root pointers, from the application's register file, application stack, and known roots in the data segment are used to find memory references into the application's memory heap. This is accomplished by initiating a mark stack with these known roots.

The mark phase removes application memory heap addresses from the mark stack and uses the memory references in conjunction with information about the object pointed to the discovered pointer to provide any pointers stored in this object. The minimum amount of information necessary about the object is in its starting address and length, which can be obtained from the memory allocator. For such an object, any properly aligned data words could be legal pointers. Any newly discovered legal application memory heap addresses found in this way are then pushed on the mark stack and the reachable objects are marked in a mark array. The algorithm iterates until the application memory heap is empty. The following code fragment is an example of the mark-and-sweep algorithm:
function DFS (x)
  if x is a pointer into the heap then
  if record x is not marked then
    mark record x
    for i:=1 to |x| do
      DFS (x. $f_i$)
function Mark ( )
  for each program variable v do
  DFS Once the algorithm has traversed all reachable application memory heap objects, the mark bits represent a bitmap of all reachable objects. All unmarked objects can be deallocated using a linear sweep over the application memory heap. The following code fragment is an example of the sweep and freelist compiling of one embodiment of a mark-and-sweep algorithm.

```
Function sweep ( )
    p := first address in heap
        while p < last address in heap do
            if record p is marked then
                unmark record p
            else
                p.f₁ := freelist
                freelist := p
            p := p+sizeof (record p)
```

As noted, a recursive approach such as outlined above with the mark-and-sweep algorithm may affect performance by requiring too many resources in order to perform the function. An alternative approach to the general mark-and-sweep algorithm discussed above is to implement a loop over a garbage collection work queue, rather than a recursive approach. Using this approach, and by way of example only, the mark portion of the mark-and-sweep algorithm could be modified as follows:

```
Function mark ( )
{
  while (! Empty(Wq)){
    nca = get_next_wqe(WQ)
    do_gc(nca);
  }
}
function do_gc(x)
    if x is a pointer into the heap then
    if record x is not marked then
        mark record x
        for i: = 1 to |x| do
            enqueue (WQ, x.fs_i)
    function Mark ( )
        for each program variable v do
            enqueue (WQ, v)
            mark (WQ, v)
```

The above-noted processing advantageously converts the basic mark-and-sweep algorithm into an enqueuing based algorithm with queues being managed to establish the locality relationship desired for locality domain-based garbage collection processing as disclosed herein.

Figure 4A:
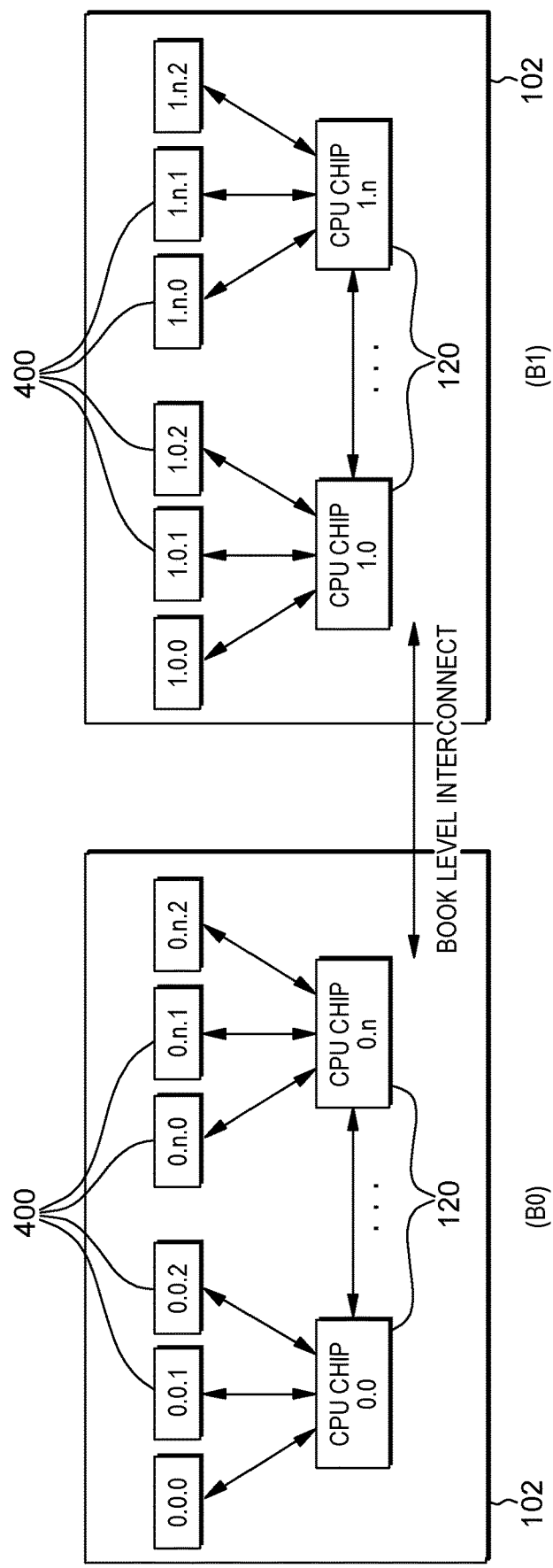
FIGS. 4A-4C depict memory locality relative to various levels of system architecture of a computing environment to incorporate and use one or more aspects of the present invention.
Figure 4B:
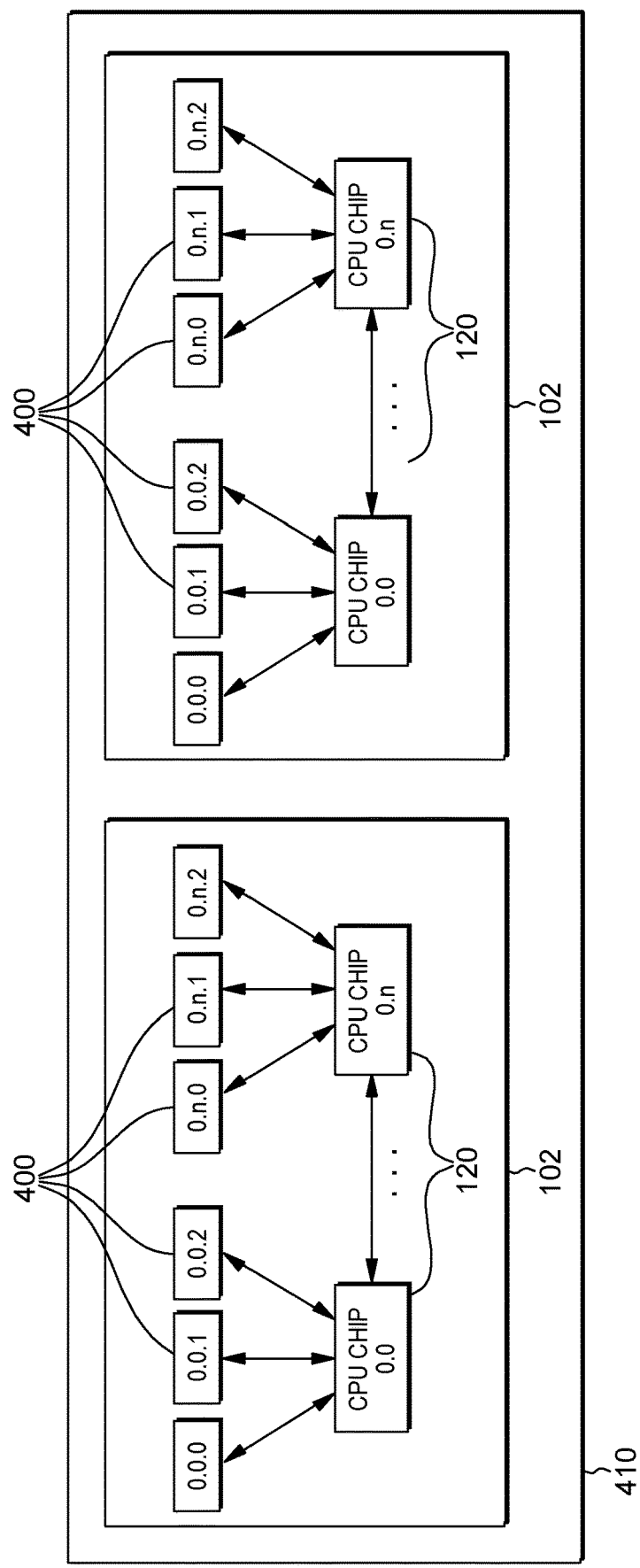
Figure 4C:
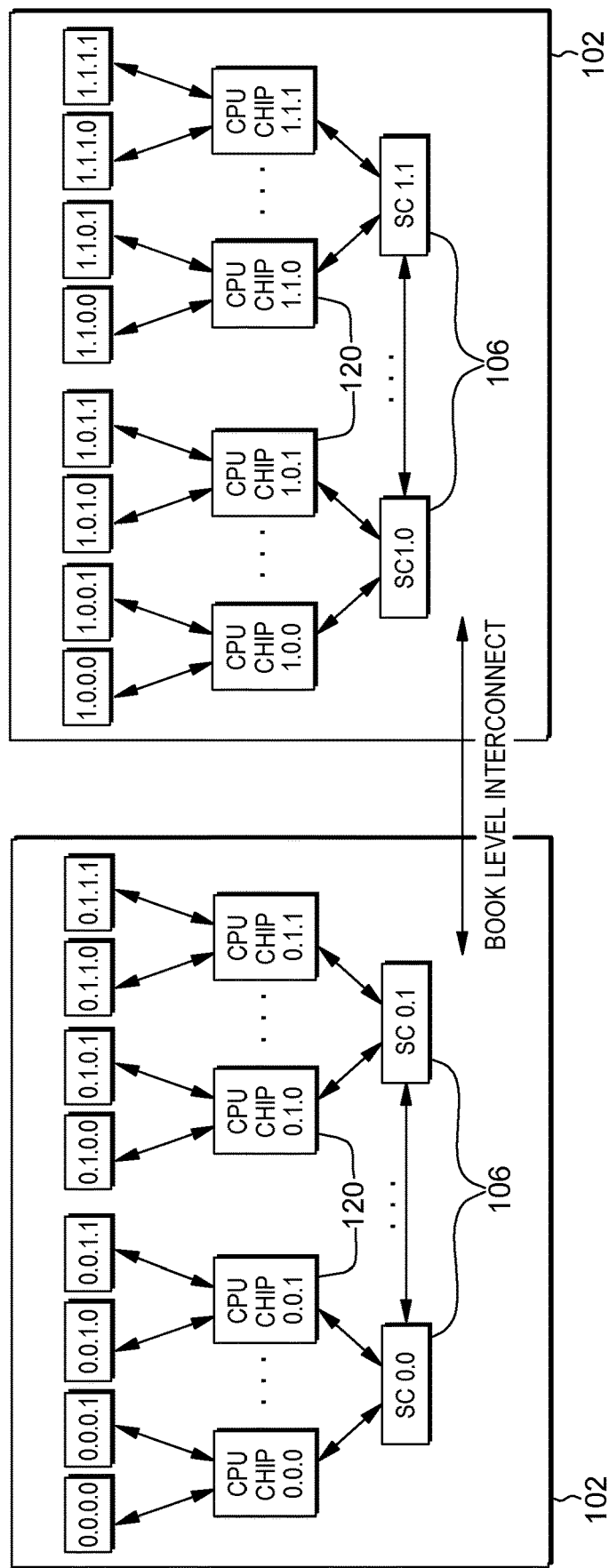

Locality domain-based garbage collection processing such a disclosed herein may be implemented at a variety of system architectural levels. FIGS. 4A-4C depict examples of different system levels which may utilize these concepts. In FIG. 4A, book 0 (B0) and book 1 (B1) 102 of a NUMA computing environment are illustrated, which also includes book (or drawer or board) level interconnect such as described above in connection with FIGS. 1A-3. Each book 102 includes (in this example) multiple CPU chips 120 each with a chip locality domain, and multiple memory channels 400, each with different locality characteristics to processors on the same chip 120. As depicted in FIG. 4B, an application image 410 can span processors and memory on memory channels in multiple locality domains across multiple locality domain hierarchy levels. FIG. 4C depicts the computing environment of FIG. 4A with system controller chips 106 shown adding another hierarchy level to the architecture depicted. In this implementation, multiple memory channels 400 are shown with different locality characteristics to processors on the same CPU chip 120. In the illustrated architecture, there are both CPU chip locality domains and system chip locality domains. As explained, an application or application image may have different processors assigned to it that are in different CPU chips, and that have different local memories or different memory channels, and may span different books (or drawers, boards, etc.). That is, a single application may utilize processors running on multiple books.

Figure 5A:
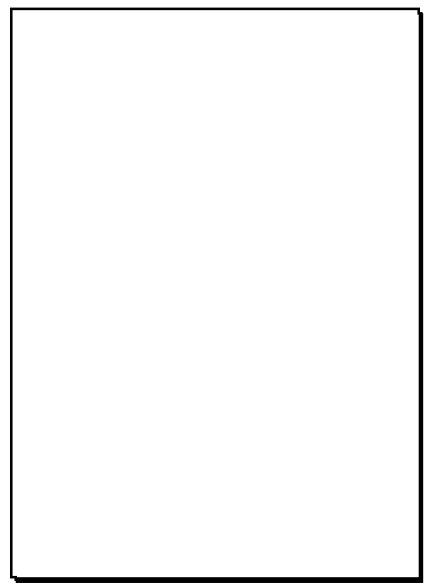

By way of further explanation, and as noted, in one embodiment a unified (or global) work queue, such as depicted in FIG. 5A, may be used with affinitized garbage collection processing as disclosed herein. A single unified or global work queue implementation may advantageously be used in certain legacy systems where garbage collection work queues are provided. One embodiment of garbage collection processing, in accordance with one or more aspects, using a unified or global garbage collection work queue such as depicted in FIG. 5A could employ (by way of example only) an algorithm such as:

```
while (!empty)
{
    next_candidate_address = myhead - >address;
    myhead - > processed = TRUE;
    domain = get_domain (next_candidate_address);
    if (domain == mydomain){
        do_gc(next_candidate_address);
        if (myhead == global_queue_head){
            inc_global_queue_head_sychronized( );
            // also skips processed WQ entries
        }
    }
    myhead++;
}
```

In this process, the locality domain of a candidate address (or memory region) is obtained and then compared to the locality domain of a current processor. Assuming that there is a match, then garbage collection processing is allocated to that processor. Using this approach, the processors only perform garbage collection processing when the local domains match. In another embodiment, when no local entries are available to a processor in the work queue, the garbage collection worker (i.e., processor) may perform non-local GC memory region scanning. One exemplary implementation of this process would be:

```
while (!empty)
{
    if (myhead != global_tail) {
        next_candidate_address = myhead - > address;
        domain = get_domain (next_candidate_address);
        if (myhead == global_queue_head)
            inc_global_queue_head_sychronized ( );
        myhead++;
    } else {
        domain=mydomain;
        next_candidate_address =
        get_global_queue_head_synchronized( );
    }
    if (domain == mydomain)
        do_gc (next_candidate_address);
}
```

With this approach, should a processor run out of local memory to perform garbage collection on, it may share the garbage collection workload of other processors in order that the overall garbage collection work be completed sooner.

As noted above, in another implementation, work queues may be allocated for each locality domain at one or more architectural levels of the computing environment. In the example of FIG. 5B, each book 102 (FIGS. 1A-4C) is assigned a work queue. This implementation assumes that mapping is stable sufficiently for enqueuing in the right domain queue, and still allow for a correct assignment when an item is retrieved from the work queue. In one or more embodiments, each work queue corresponding to a locality domain may be allocated in memory corresponding to that locality domain.

Any number of work queues may be utilized depending upon the desired number of locality domains within the architecture. For instance, locality domains at the CPU chip level and/or at the system chip level could be utilized. In this approach, the GC processing is simplified in that the processor is only working on memory in the associated (i.e., localized) work queue structure. By way of example only, one embodiment for implementing garbage collection processing utilizing such an approach would be:

```
while(!empty(myWQ)){
    next_candidate_address = mq_head->address;
    do_gc (next_candidate_address);
    mq_head++;
}
```

In this multiple work queue implementation, load sharing may also be implemented by processors where a processor has no local memory to garbage collect. An example of such a process would be:

```
while (!done)
{
  if (!empty(myWQ){
      next_candidate_address = mq_head - >address;
      //exemplary code to obtain next entry
      do_gc (next_candidate_address);
      mq_head++; //exemplary code to remove processed entry
  } else {
      next_candidate_address = work_steal(otherWQ);
      //exemplary code for "work stealing"
      do_gc(next_candidate_address);
  }
}
```

Note that in a multiple queue environment, a decision needs to be initially made where to place a work item (i.e., a memory region to undergo garbage collection). An example of this code may comprise:

```
enqueue(item_type item)
{
  domain = get_domain (item);
    switch(domain){
      case0:
          add_to_wq0(item);
      case1:
          add_to_wq1(item);
      default
          abort( ); // example with 2 WQs, other
          work queue numbers are prog error
    }
```

Note also that in one or more embodiments, processors may be affinity or locality aware, and (for example) prioritize the next nearest memory port when they have no additional local domain memory to scan. An example of this processing may be:

```
If (!empty (own_WQ))
      process(own_WQ)
else if (!empty (nearest_other_WQ))
      process(nearest_other_WQ))
else if (!empty (next_nearest_other_WQ))
      process(next_nearest_other_WQ))
else {etc etc.}
```

In accordance with one or more further aspects, a capability is provided to facilitate obtaining domain information for memory, and to determine locality of a unit of memory relative to a current processing domain of the computing environment (such as the above-discussed NUMA computing environment) for facilitating affinity-domain-based garbage collection.

Figure 6:
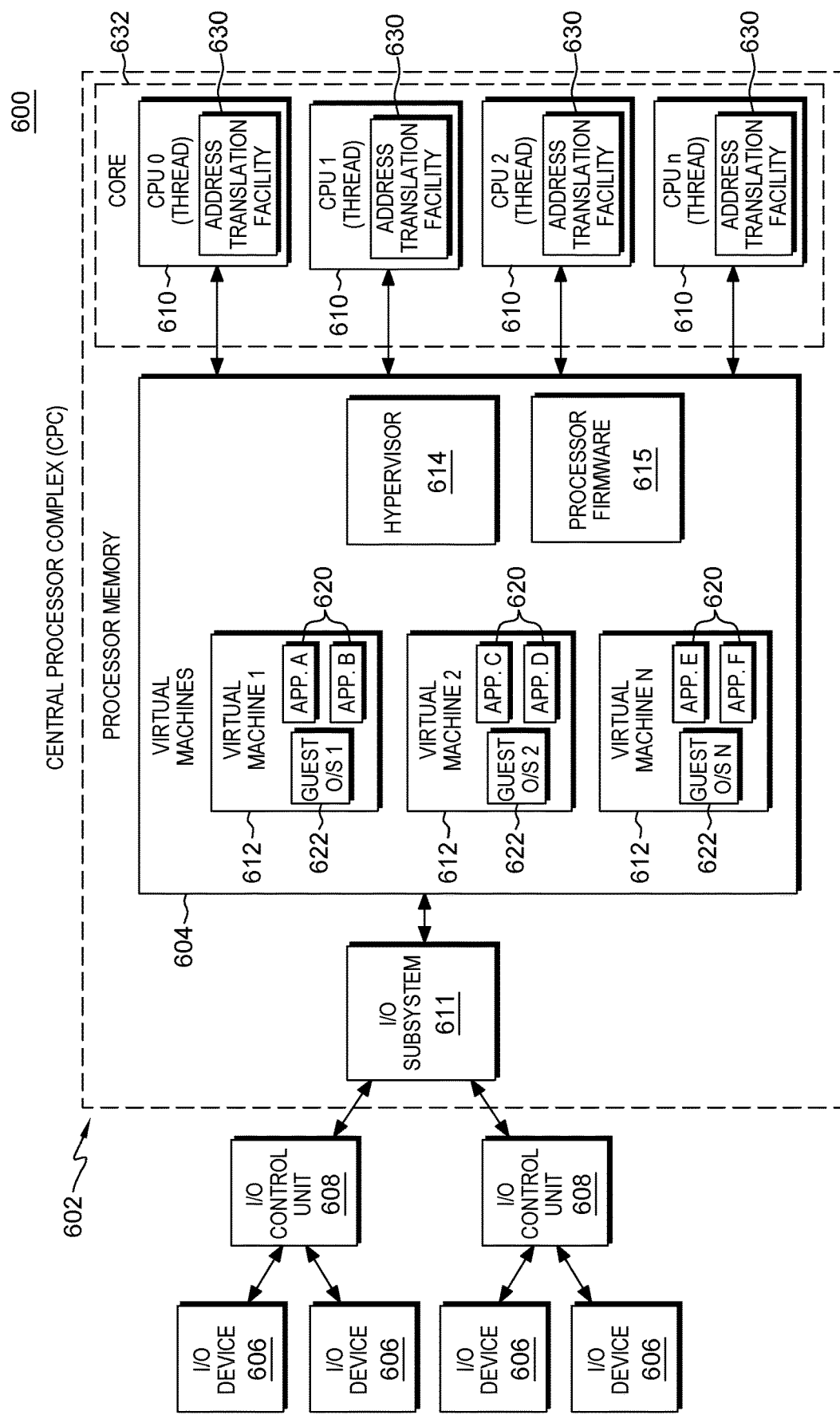
FIG. 6 depicts another example of a computing environment to incorporate and use one or more aspects of the present invention.

Another example of a computing environment to incorporate and use one or more aspects of the present invention is described below with reference to FIG. 6. Referring to FIG. 6, in one example, computing environment 600 may again be based on the z/architecture, offered by International Business Machines Corporation, Armonk, N.Y. In another example, the computing environment may be based on the POWER architecture, offered by International Business Machines Corporation, Armonk, N.Y., USA.

Computing environment 600 includes a central processor complex (CPC) 602 providing virtual machine support. CPC 602 is coupled to one or more input/output (I/O) devices 606 via one or more control units 608. Central processor complex 602 includes, for instance, a processor memory 604 (a.k.a., main memory, main storage, central storage) coupled to one or more central processors (a.k.a., central processing units (CPUs)) 610, and an input/output subsystem 611, each of which is described below.

Processor memory 604 includes, for example, one or more virtual machines 612, a virtual machine manager, such as a hypervisor 614, that manages the virtual machines, and processor firmware 615. One example of hypervisor 614 is z/VM®, offered by International Business Machines Corporation, Armonk, N.Y. The hypervisor is sometimes referred to as the host. Further, as used herein, firmware includes, e.g., the microcode and/or millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

The virtual machine support of the CPC provides the ability to operate large numbers of virtual machines 612, each capable of operating with different programs 620 and running a guest operating system 622, such as Linux. Each virtual machine 612 is capable of functioning as a separate system. That is, each virtual machine can be independently reset, run a guest operating system, and operate with different programs. An operating system or application program running in a virtual machine appears to have access to a full and complete system, but in reality, only a portion of it is available.

Processor memory 604 is coupled to central processors (CPUs) 610, which are physical processor resources assignable to virtual machines. For instance, virtual machine 612 includes one or more logical processors, each of which represents all or a share of a physical processor resource 610 that may be dynamically allocated to the virtual machine. In one or more embodiments, central processor 610 may include an address translation facility 630, such as described herein.

Additionally, in one embodiment, each CPU 610 is a hardware thread executing within a processing core (a.k.a., core) 632. A core includes one or more threads, and in this example, core 632 includes four hardware threads. In other examples, the computing environment may include one or more cores, and each core may include one or more hardware threads.

As noted above in connection with FIGS. 1A-3, in one or more implementations, computing environment 600 may be a non-uniform memory access (NUMA) computing environment or system. As explained, in such a computing environment, processor memory 604 may be distributed to, for instance, across one or more cores, processors, or central processing units, such as central processing units 610. Further, as explained above, various levels of locality domains may be defined within the NUMA computing environment, including at the CPU level. In one or more implementations, processor memory 604 connected to a particular CPU 610 may be considered local to that processor.

Further, processor memory 604 is coupled to an I/O subsystem 611. Input/output subsystem 611 directs the flow of information between input/output control units 608 and devices 606 and main storage 604. It is coupled to the central processing complex, in that it can be a part of the central processing complex or separate therefrom.

In one example, the model of virtual machines may be a V=V model, in which the real or absolute memory of a virtual machine may be backed by host virtual memory, instead of real or absolute memory. Each virtual machine has a contiguous virtual memory space. The physical resources may be managed by host 614, and the shared physical resources may be dispatched by the host to the guest operating systems, as needed, to meet their processing demands. This V=V virtual machine (i.e., pageable guest) model assumes that the interactions between the guest operating systems and the physical shared machine resources are controlled by the host, since the large number of guests typically precludes the host from simply partitioning and assigning the hardware resources to the configured guests.

In one embodiment, the host (e.g., z/VM®) and processor (e.g., System z) hardware/firmware interact with each other in a controlled cooperative manner in order to process guest operating system operations without requiring the transfer of control from/to the guest operating system and the host. Guest operations can be executed directly without host intervention via a facility that allows instructions to be interpretively executed for the guest, including a pageable storage mode guest. This facility provides an instruction, Start Interpretive Execution (SIE), which the host can issue, designating a control block called a state description which holds guest (virtual machine) state and controls, such as execution controls and mode controls. The instruction places the machine into an interpretive-execution mode in which guest instructions and interruptions are processed directly, until a condition requiring host attention arises. When such a condition occurs, interpretive execution is ended, and either a host interruption is presented, or the SIE instruction completes storing details of the condition encountered; this latter action is called interception.

The computing environments described herein support architectural functions, such as dynamic address translation (DAT). With appropriate support by an operating system, the dynamic address translation facility may be used to provide to a user a system in which storage appears to be larger than the main storage (a.k.a., main memory) which is available in the configuration. This apparent main storage is referred to as virtual storage, and the addresses used to designate locations in the virtual storage are referred to as virtual addresses. The virtual storage of a user may far exceed the size of the main storage which is available in the configuration and normally is maintained in auxiliary storage (e.g., storage not directly addressable). The virtual storage is considered to be composed of blocks of addresses, called pages. Only the most recently referred to pages of the virtual storage are assigned to occupy blocks of physical main storage (e.g., random access memory (RAM)). As the user refers to pages of virtual storage that do not appear in main storage, they are brought in to replace pages in main storage that are less likely to be needed. The swapping of pages of storage may be performed by the operating system without the user's knowledge.

Moreover, in virtual computing environments, the interpretive execution architecture provides a storage mode for absolute storage referred to as a pageable storage mode. In pageable storage mode, dynamic address translation at the host level is used to map guest main storage. The host has the ability to scatter the real storage of pageable storage mode guests to usable frames anywhere in host real storage by using the host DAT, and to page guest data out to auxiliary storage. This technique provides flexibility when allocating real machine resources while preserving the expected appearance of a contiguous range of absolute storage for the guest.

A virtual machine environment may call for application of DAT multiple times: first at the guest level, to translate a guest virtual address through guest managed translation tables into a guest non-virtual address, and then, for a pageable guest, at the host level, to translate the corresponding host virtual address (i.e., guest non-virtual address) to a host a non-virtual address, such as a host real or absolute address.

A sequence of virtual addresses associated with virtual storage is called an address space, and the dynamic address translation facility may be used to provide a number of address spaces. These address spaces may be used to provide degrees of isolation between users. Such support can include a completely different address space for each user, thus providing complete isolation, or a shared area may be provided by mapping a portion of each address space to a single common storage area. Also instructions are provided which permit a semi-privileged program to access more than one such address space. Dynamic address translation provides for the translation of, for instance, virtual addresses from multiple different address spaces without requiring that the translation parameters in the control registers be changed.

Dynamic address translation is the process of translating a virtual address during a storage reference into the corresponding real or absolute address. Dynamic address translation may be specified for instruction and data addresses generated by the CPU. The real or absolute address that is formed by dynamic address translation, and the absolute address that is then formed by prefixing, in one embodiment, are 64 bits in length. The virtual address may be a primary virtual address, a secondary virtual address, an access register (AR)-specified virtual address, or a home virtual address. The addresses are translated by means of the primary, the secondary, an AR-specified, or the home address space control element (ASCE), respectively. After selection of the appropriate address space control element, the translation process is the same for all of the four types of virtual addresses. An address space control element may be a segment table designation or a region table designation. A segment table designation or region table designation causes translation to be performed by means of tables established by the operating system in real or absolute storage.

In the process of translation when using a segment table designation or a region table designation, three types of units of information are recognized—regions, segments, and pages. The virtual address, accordingly, is divided into four fields. In one example, bits 0-32 are called the region index (RX), bits 33-43 are called the segment index (SX), bits 44-51 are called the page index (PX), and bits 52-63 are called the byte index (BX). The RX part of a virtual address is itself divided into three fields. Bits 0-10 are called the region first index (RFX), bits 11-21 are called the region second index (RSX), and bits 22-32 are called the region third index (RTX), in one embodiment.

Figure 7A:
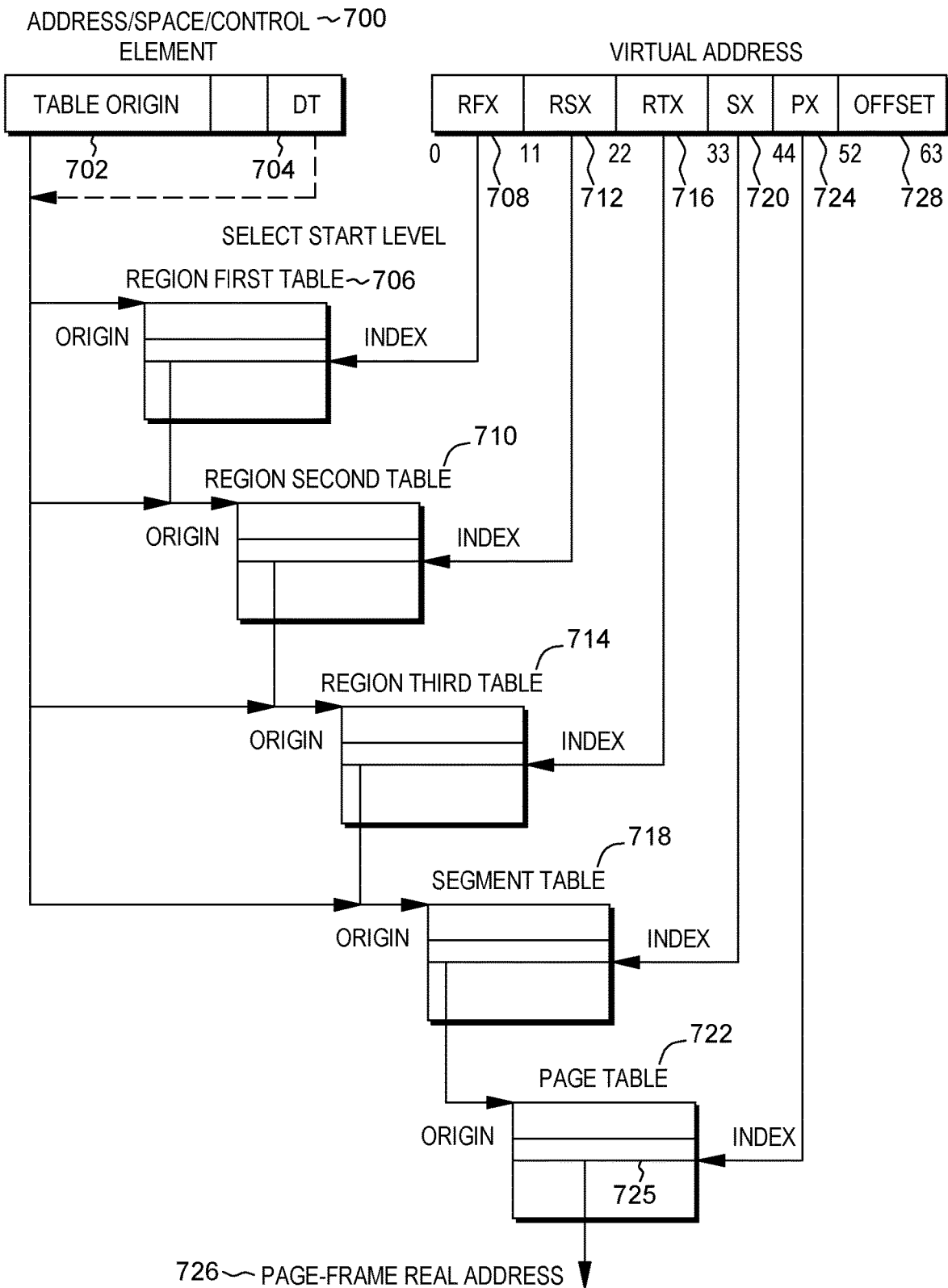
FIG. 7A depicts one example of address translation.

One example of translating a virtual address to a real address is described with reference to FIG. 7A. This process is referred to herein as a DAT walk (or a page walk) in which the address translation tables are walked to translate one address (e.g., a virtual address) to another address (e.g., a real address). In this example, an address space control element (ASCE) 700 includes a table origin 702, as well as a designation type (DT) control 704, which is an indication of a start level for translation (i.e., an indication at which level in the hierarchy address translation is to begin). Using table origin 702 and DT 704, the origin of a particular table is located. Then, based on the table, bits of the virtual address are used to index into the specific table to obtain the origin of the next level table. For instance, if the region first table (RFT) 706 is selected, then bits 0-10 (RFX) 708 of the virtual address are used to index into the region first table to obtain an origin of a region second table (RST) 710. Then, bits 11-21 (RSX) 712 of the virtual address are used to index into region second table 310 to obtain an origin of a region third table (RTT) 714. Similarly, bits 22-32 (RTX) 716 of the virtual address are used to index into region third table 714 to obtain an origin of a segment table 718. Then, bits 33-43 (SX) 720 of the virtual address are used to index into segment table 718 to obtain an origin of page table 722, and bits 44-51 (PX) 724 of the virtual address are used to index into page table 722 to obtain a page table entry (PTE) 725 having a page frame real address (PFRA) 726. The page frame real address is then combined (e.g., concatenated) with offset 728 (bits 52-63) to obtain a real address. Prefixing may then be applied to obtain the corresponding absolute address.

Figure 7B:
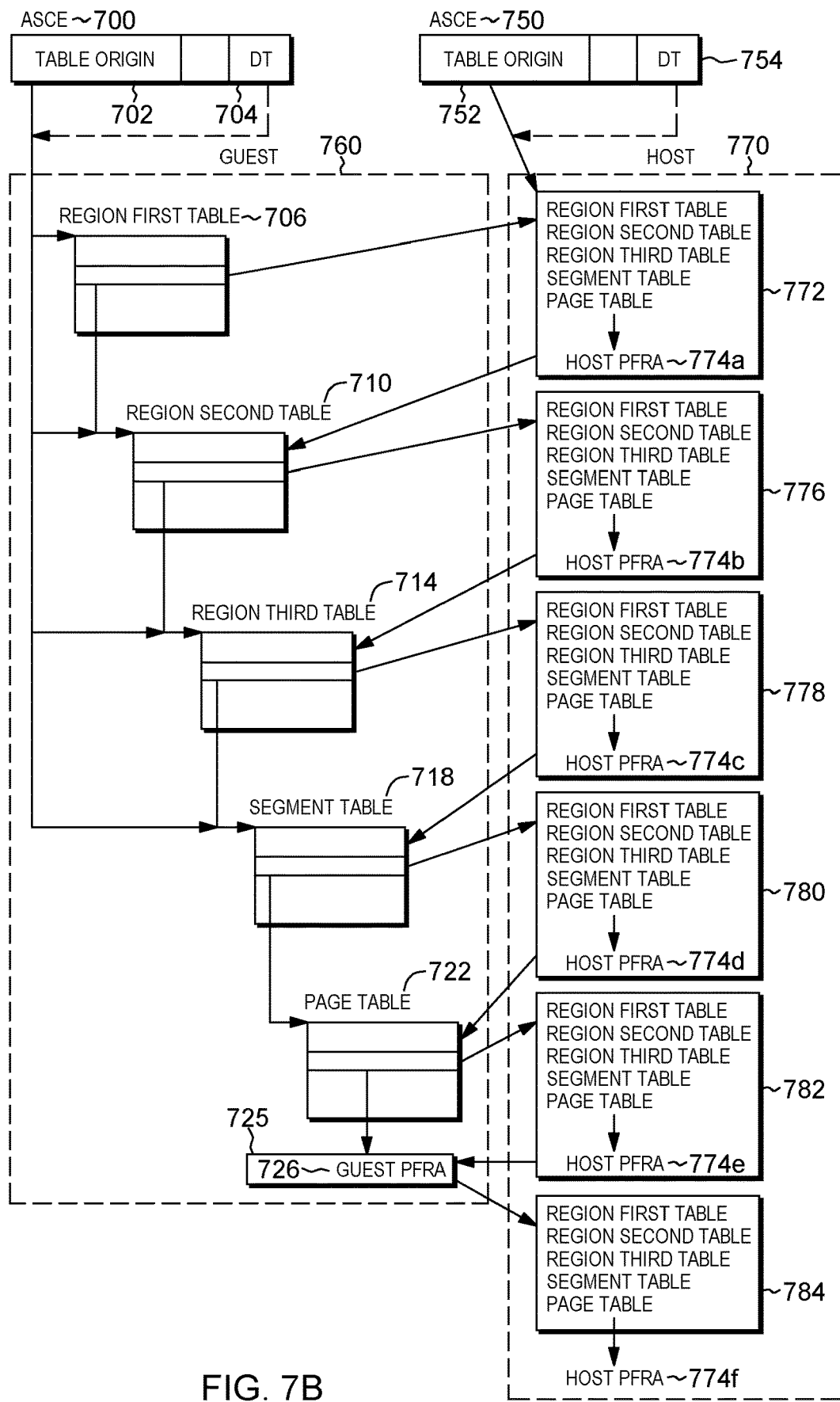
FIG. 7B depicts another example of address translation.

Another example of address translation is described with reference to FIG. 7B. In this example, a DAT walk is performed to translate an initial guest virtual address to a final host real address. In this example, address space control element (ASCE) 700 is a guest address space control element, and DT 704 of ASCE 700 indicates that guest translation determined by guest address translation structures 760 is to start at region first table 706 pointed to by table origin 702. Thus, the appropriate bits of the initial guest virtual address (e.g., RFX 708) are used to index into region first table 706 to obtain a pointer of an entry of the region first table. The address of the region first table entry (RFTE) is a guest real or absolute address. This guest real or absolute address, with the main storage origin and limit applied, corresponds to a host virtual address. This intermediate host virtual address is then translated using host address translation structures 770. In particular, address space control element (ASCE) 750 is a host address space control element used to indicate a start level for translation in host address translation structures 772. Based on the start level (e.g., region first table) indicated by DT 754 of ASCE 750, the particular bits of the host virtual address are used to index into the indicated table with table origin 752 to be used for translation using host address translation structure 772, as described with reference to FIG. 7A. The translation of the host virtual address corresponding to the guest RFTE continues until a host page frame real address (PFRA) 774*a* is obtained.

Data at the intermediate host page frame real address is a pointer to the next level of guest address translation structures (e.g., guest region second table 710, in this particular example), and translation continues, as described above. Specifically, host address translation structures 776, 778, 780 and 782 are used to translate the intermediate host virtual addresses associated with the guest region second table 710, region third table 714, segment table 718 and page table 722, respectively, resulting in host PFRAs 774*b*, 774*c*, 774*d* and 774*e*, respectively. Host page frame real address 774*e* includes the address of a guest page table entry 725. Guest page table entry 725 includes a guest page frame real address 726, which is concatenated with the offset from the initial guest virtual address to obtain the corresponding guest absolute address. The main storage origin and limit are then applied to calculate the corresponding host virtual address, which is then translated, as described above, using address translation structures 784 to obtain host page frame real address 774*f*. The host page frame real address is then combined (e.g., concatenated) with the offset (e.g., bits 52-63) of the host virtual address to obtain the final host real address. This completes translation of a guest virtual address to a host real address.

Although in the above examples translation starts at the region first table, this is only one example. Translation may start at any level for either the guest or the host.

Further, in one embodiment, to improve address translation, a virtual address to real or absolute address translation mapping may be stored in an entry of a structure associated with address translation, such as a translation look-aside buffer (TLB). The TLB is a cache used by the memory management hardware to improve virtual address translation speed. The next time translation for a virtual address is requested, the TLB will be checked and if it is in the TLB, there is a TLB hit and the real or absolute address is retrieved therefrom. Otherwise, a page walk is performed, as described above.

Figure 7C:
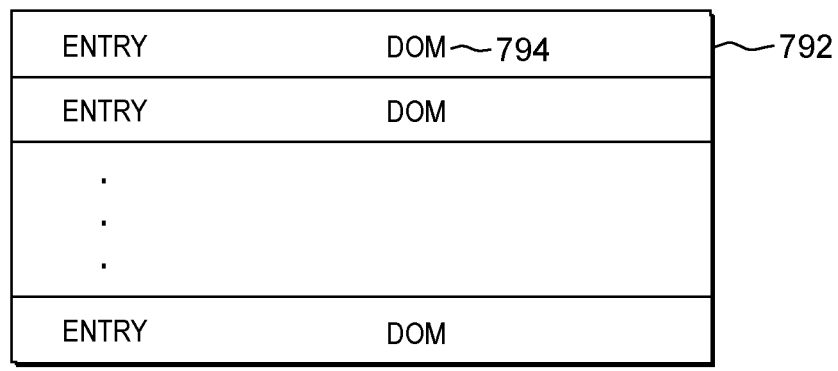
FIG. 7C depicts one example of a translation lookaside buffer (TLB) caching locality domain information of units of memory, in accordance with one or more aspects of the present invention.

In one example, as depicted in FIG. 7C, a translation look-aside buffer 790 may include one or more entries 792. An entry may be for a host or for a guest of the computing environment, and may be marked as such with an indicator or value. Further a DOM indicator 794 may be provided for use as described herein below. (For instance, the DOM indicator may store the locality domain, or alternatively, a locality domain indicator (e.g., domain is local, domain is not local), in accordance with one or more aspects of the present invention.) Further, an entry may be associated with a page table entry, a region table entry or a segment table entry of the address translation tables. Many implementations of a translation look-aside buffer are possible.

As indicated, guest translations may be included in the TLB. These entries may be composite guest/host entries which implicitly include one or more host translations. For example, a guest virtual TLB entry may buffer the entire translation from the initial guest virtual address down to the final host real or absolute address. In this case, the guest TLB entry implicitly includes all intermediate host translations 772, 776, 778, 780 and 782, as well as the final host translation 784, as described in FIG. 7B above. In another example, a hierarchical TLB may contain an entry in a first level of the TLB which buffers a translation from the initial guest virtual address down to the associated origin of the guest page table 722. This first level entry represents, for instance, a combined region and segment table entry (CRSTE) and may be referred to as the CRSTE portion of the TLB. Further, the hierarchical TLB may contain a separate entry from a second level of the TLB which buffers the translation from the guest page table entry address down to the final host real or absolute address. In this example, guest entries in the first level of the TLB implicitly include intermediate host translations 772, 776, 778 and 780 which correspond to the host translations which back guest region and segment tables, and guest entries in the second level implicitly include intermediate host translation 782 which backs the guest page table and final host translation 784, as described in FIG. 7B. Many implementations of a translation look-aside buffer are possible.

Figure 8:
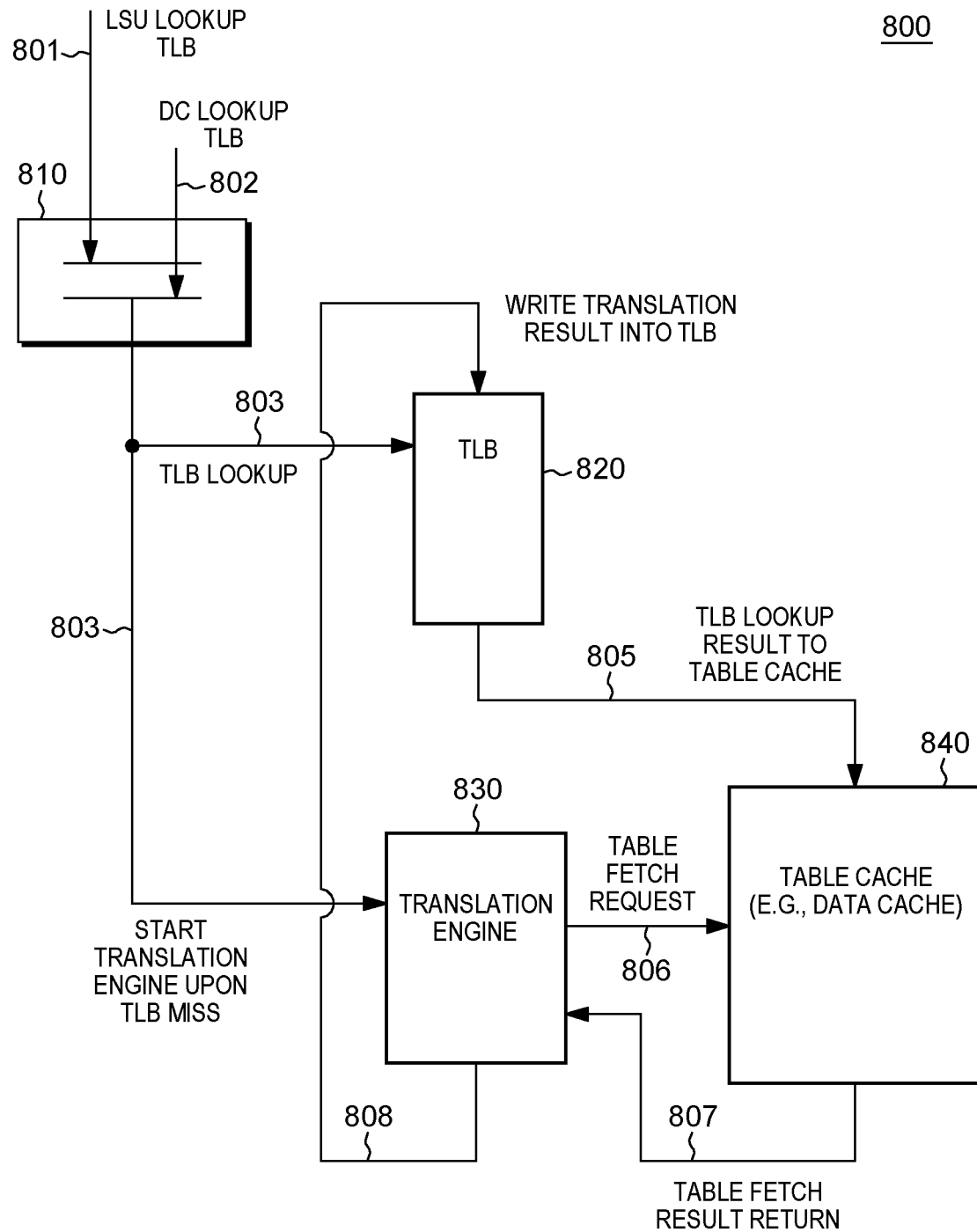
FIG. 8 depicts one embodiment of an address translation facility to incorporate and use one or more aspects of the present invention.

FIG. 8 depicts one embodiment of an address translation facility 800 which may be used in accordance with one or more aspects of the present invention. As illustrated, address translation facility 800 may include an input multiplexor 810, which multiplexes translation requests including, for instance, load store unit (LSU) lookup request to TLB 801 and data cache (DC) lookup request to TLB 802 (where the table cache is implemented within the data cache). A selected TLB lookup request 803 is forwarded to a translation lookaside buffer (TLB) 820, as well as to a translation engine 830. The TLB request initiates or starts translation engine 830 upon a TLB miss based on the TLB lookup request 803. Note that if there is a TLB hit, then the TLB lookup result 805 is written to, for instance, a table cache 840, which may reside in the data cache. Assuming that there is a TLB miss, then translation 830 processes the lookup request, and in doing so, may send table fetch request 806 to table cache 840, which returns fetch results 807. Translation engine 830 writes the translation result 808 into TLB 820 so that with the next selecting of the initiating TLB lookup request, the translation result will be within TLB 820, resulting in a request hit.

As noted initially, as processor designs continue to become increasingly asymmetric and non-uniform, it becomes increasingly advantageous to place processing tasks to a processor (or more generally, to a processing domain) that has the lowest or optimum latency and best bandwidth characteristics to a given unit of memory (e.g., location, address, area, page, etc.). As noted above, in a NUMA computing environment, real memories are attached to or associated with specific processing domains, such as specific processor cores, processor chips, processor modules, processor books and other physical structures, rather than uniformly accessed by a shared single symmetric switch. Thus, the elements most closely located to a memory have better access characteristics for that memory.

In another aspect, discovery of physical locality domains and performance affinity for memory may advantageously be used as described herein in connection with fully virtualized systems and/or in conjunction with legacy software stacks. Within these contexts, it is desirable to provide a mechanism to identify affinity or locality of a unit of memory to a particular processing domain.

In paravirtualized systems, such as PHYP, and the PAPR specification it implements, a mechanism is provided to request memory attached to specific processors or processor nodes. However, these systems require memory management to be performed via hypervisor calls, rather than directly in an operating system or application.

As discussed herein, for an application to be able to locate processing on a processor close to memory, it is necessary to determine the affinity of the memory with respect to processing capability, so that processing tasks on a units of memory may be placed on or executed by the appropriate processing domain (e.g., processor). Thus, in accordance with one or more aspects disclosed herein, an interface is provided to query the affinity or locality of a unit of memory to, for instance, facilitate processing within the computing environment, such as to facilitate a domain-based garbage collection process.

In accordance with one embodiment, an instruction is provided (load_domain) which takes a unit of memory and provides physical locality domain information for that memory. In one embodiment, the domain information may be a number uniquely identifying one or more locality-related (or affinity-related) attributes of the memory (e.g., identifying a related processor core, node, book, etc.). In accordance with one aspect, the query response may uniquely identify the closest processing domain or capability, and can be used to derive next closest processing capability, etc., by obtaining physical system information either by, for instance, a lookup to a table documenting or incorporating the system structure, or by a system call providing such a table, etc. In another embodiment, a pointer may be returned, with the pointer providing information, such as about hierarchy levels and nodes that a memory region corresponds to, or distances to each processing domain element within the computing environment.

In accordance with one or more aspects, at least one of a system call or an instruction may be provided to obtain for a unit of memory a processor identification (ID) or token that identifies a locale identifier that it corresponds to (for instance, a locale number such as a book number, processor number, etc.). In another embodiment, a pointer may be returned, with the pointer providing information either about hierarchy levels and nodes that memory corresponds to, or distances to each processing element. In yet a further embodiment, an instruction may be provided that takes a memory address and a processor identifier, and returns a distance of a memory location to an identified processor. If desired, the distance may be normalized and abstracted.

In one or more implementations, the functionality disclosed herein may be restricted to trusted applications, for instance, signed, set-uid, and/or programs executed by an administrator to prevent applications from discovering system details.

Figure 9:
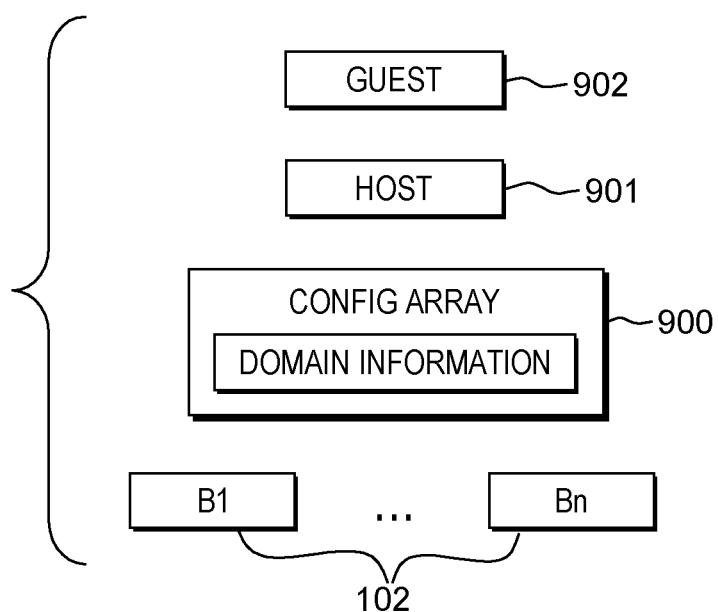
FIG. 9 depicts a simplified schematic of one example of a computing environment to incorporate and use one or more aspects of the present invention.

FIG. 9 depicts one embodiment of a computing environment, such as the above-described NUMA computing environment, depicted as a simplified, exemplary translation structure which includes books 102, as well as, for instance, a configuration (config) array 900, one or more hosts 901 and one or more guest systems or virtual machines 902. In one or more other implementations, books 102, such as in the above-discussed z/architecture computing environment, could be replaced with other domain level processing, such as chips, memory ports attached to cores, etc. The config array 900 may include physical system information that specifies (or indicates) where, for instance, particular memory is located within the computing environment. For instance, the config array 900 may include locality domain information 905 for physical memory within the system. This information may be accessed via, or as part of, for instance, an address translation process in accordance with one or more aspects disclosed herein. In particular, once a host real or absolute address is obtained, that address may be used to reference the config array, and in particular, the locality domain information within the array to obtain domain information for a particular memory region of the computing environment.

Figure 10A:
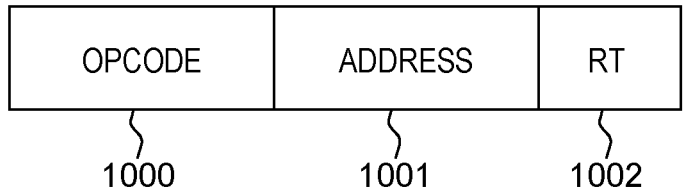
FIG. 10A depicts one embodiment of a load_domain instruction, in accordance with one or more aspects of the present invention.

FIG. 10A depicts one embodiment of a load_domain (or get domain) instruction, in accordance with one or more aspects of the present invention. As illustrated, the load_domain instruction may include, for instance, one or more operation code fields 1000 including an opcode that indicates a load_domain operation, as well as in the depicted example, an address operand 1001 to determine a domain of the specified address as part of the address translation process, and a target return (RT) field 1002 indicating a target return value for the load_domain operation. Processing the load_domain instruction may include for instance, determining locality domain information relative to the desired processing structure level, such as the book level of a NUMA computing environment, for a given memory address, location, area, etc., generally referred to herein as unit of memory (or memory unit). The domain information may be returned as, for instance, a single number, or as an address to a packed describing structure. The processing may involve walking multiple levels of page tables and accessing information, i.e., domain information, within a configuration array (config array) of the computing environment. As explained below, the locality domain information may then be cached in a data structure, such as a config array cache, or in a translation lookaside buffer in order that the next time the address lookup is required, processing overhead to retrieve the information may be reduced.

Figure 10B:
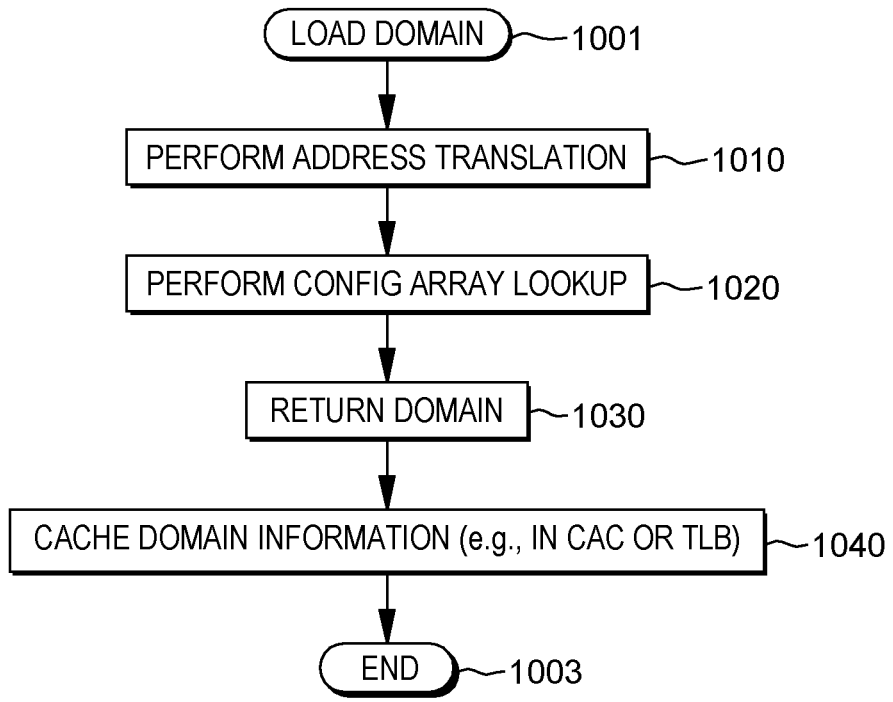
FIG. 10B depicts one embodiment of processing pursuant to a load_domain instruction, in accordance with one or more aspects of the present invention.

FIG. 10B depicts one embodiment of processing associated with a load_domain instruction. As illustrated in FIG. 10B, load_domain processing 1001 may include performing address translation 1010 to obtain a host real (or absolute) address, and then using that host real address to perform a config array lookup 1020 to, for instance, obtain domain information for that real address, and return the domain information 1030, which may then be cached, for instance, in a config array cache (CAC), or in the translation lookaside buffer (TLB) 1040, which completes the load domain processing 1003.

Note that the processing disclosed herein makes several assumptions about the computing environment. For instance, an assumption is made that memory is not striped across domains at subpage granularity. However, if the memory is striped, it is possible to solve the striping either by the striping starting at a set domain, and then following a pattern, or by all pages following a same pattern. These pattern-based stripings could thus be handled by the processing described herein as well. Further, an assumption is made that to be reachable, each page will have a TLB translation entry in hardware.

Figure 11:
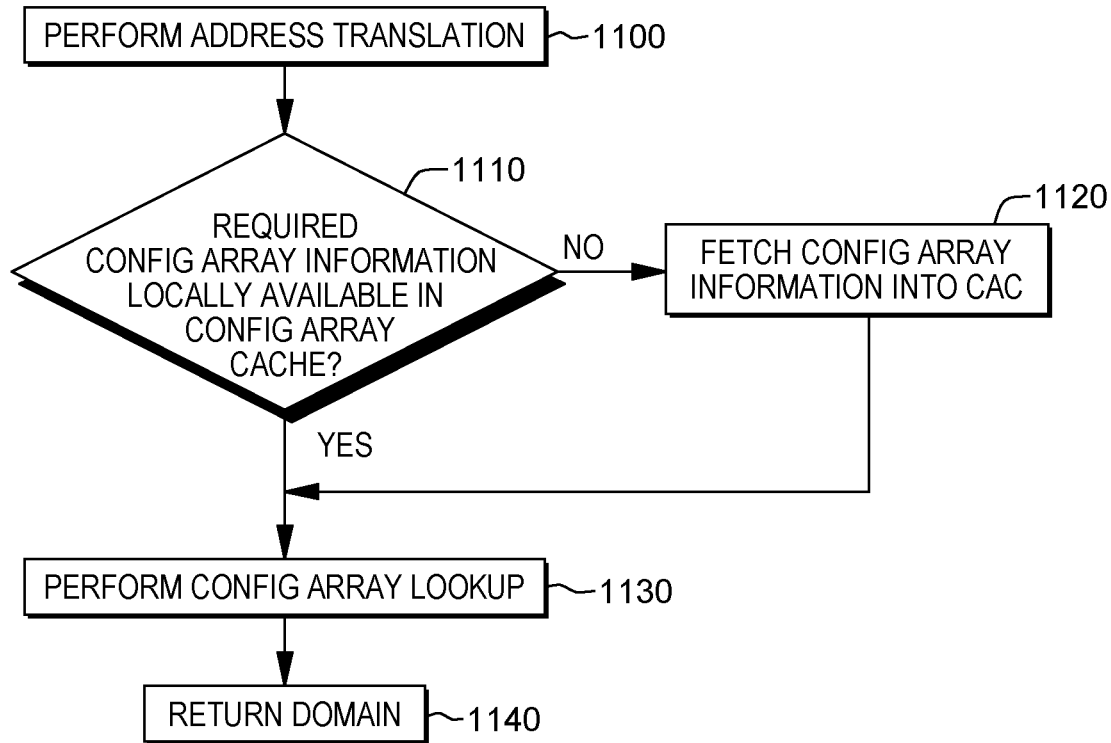
FIG. 11 depicts an alternate embodiment of processing for obtaining locality domain information of a unit of memory within a computing environment, in accordance with one or more aspects of the present invention.

Processing efficiency within a computing environment can be enhanced by efficiently providing data. In order to access locality domain information, after an architected translation, a lookup may be provided in a configuration array, such as described above. Processing may be enhanced by making the configuration array accessible, and/or by making the configuration array efficiently accessible. Further, efficiency may be enhanced by capturing the result of a locality domain lookup in a data structure, and providing a way to seek or reference this information. Multiple approaches to such a caching data structure are possible. For instance, an operating system, or application, may have associated therewith a configuration array cache which, in one or more embodiments, may be accessed by a virtual address directly, thereby avoiding the need to do address translation where the desired locality domain information has been previously obtained. In one or more embodiments, such a configuration array cache would be application maintained. Note that any application maintained storage structure may be used for this purpose. FIG. 11 depicts one embodiment of processing which may be involved. As illustrated, as part of performing address translation 1100, a determination may be made whether the desired locality domain information is locally available in a configuration array cache 1110. If "no", then a config array lookup is performed 1120, with the relevant config array information being fetched into the configuration array cache 1130. With the domain information in the config array cache, the locality domain information may be returned 1140.

Figure 12:
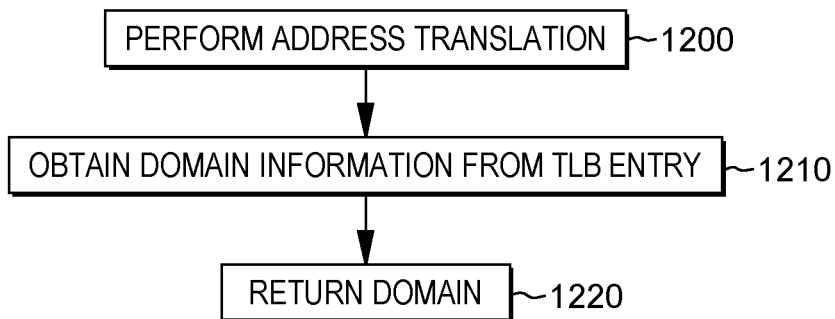
FIG. 12 depicts another embodiment of a process for obtaining locality domain information of a unit of memory, in accordance with one or more aspects of the present invention.

As illustrated above in connection with FIG. 7C, in another embodiment, the locality domain information (once retrieved) may be cached in, for instance, a translation lookaside buffer. One embodiment of this is depicted in FIG. 12, where in association with performing address translation 1200, the desired locality domain information may be obtained from the respective TLB entry 1210 (as shown, for instance, as the DOM field in FIG. 7C), and returned 1220. Note in this regard that the use of a TLB structure to manage retrieved locality domain information may be advantageous where the domain information is small, such as a few bits. This approach could be more efficient than a separate config array cache, which results in an array processing overhead.

Figure 13A:
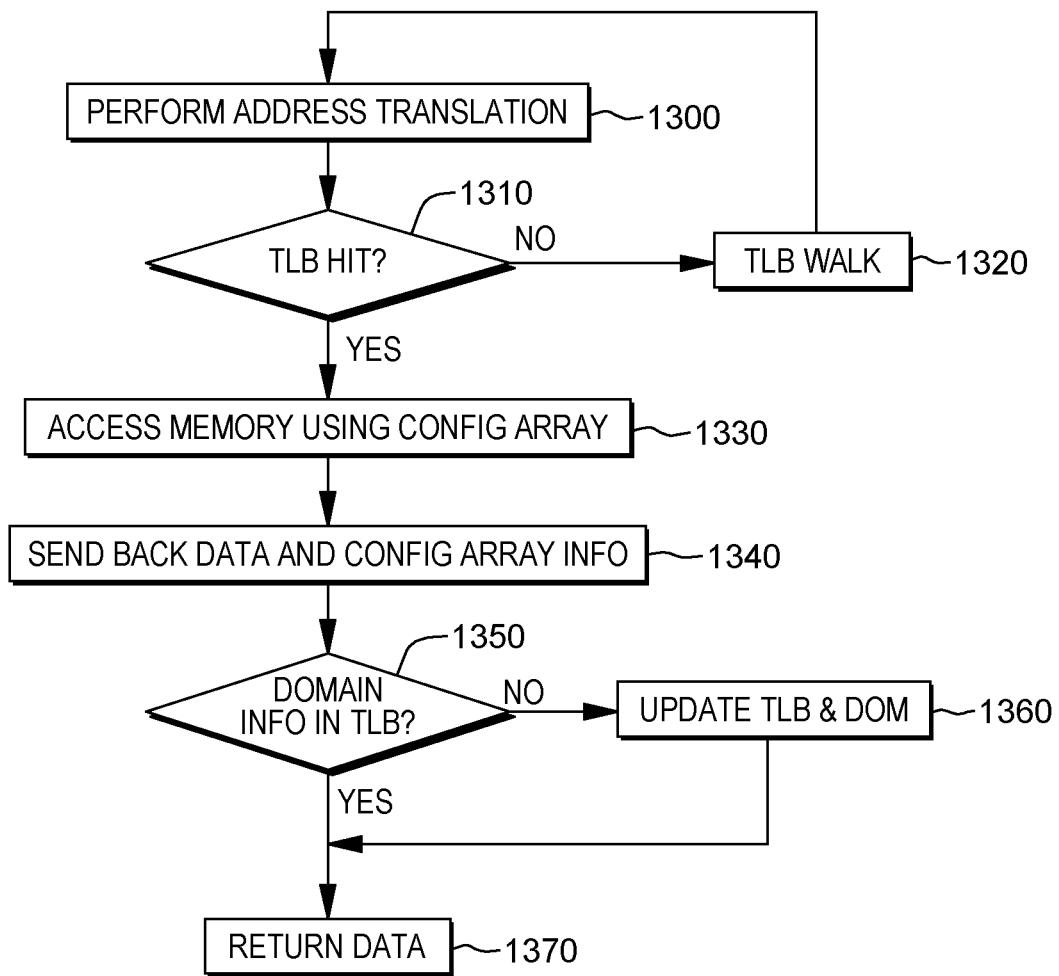
FIG. 13A depicts one embodiment of memory access processing in combination with caching locality domain information within a translation lookaside buffer (TLB), in accordance with one or more aspects of the present invention
Figure 13B:
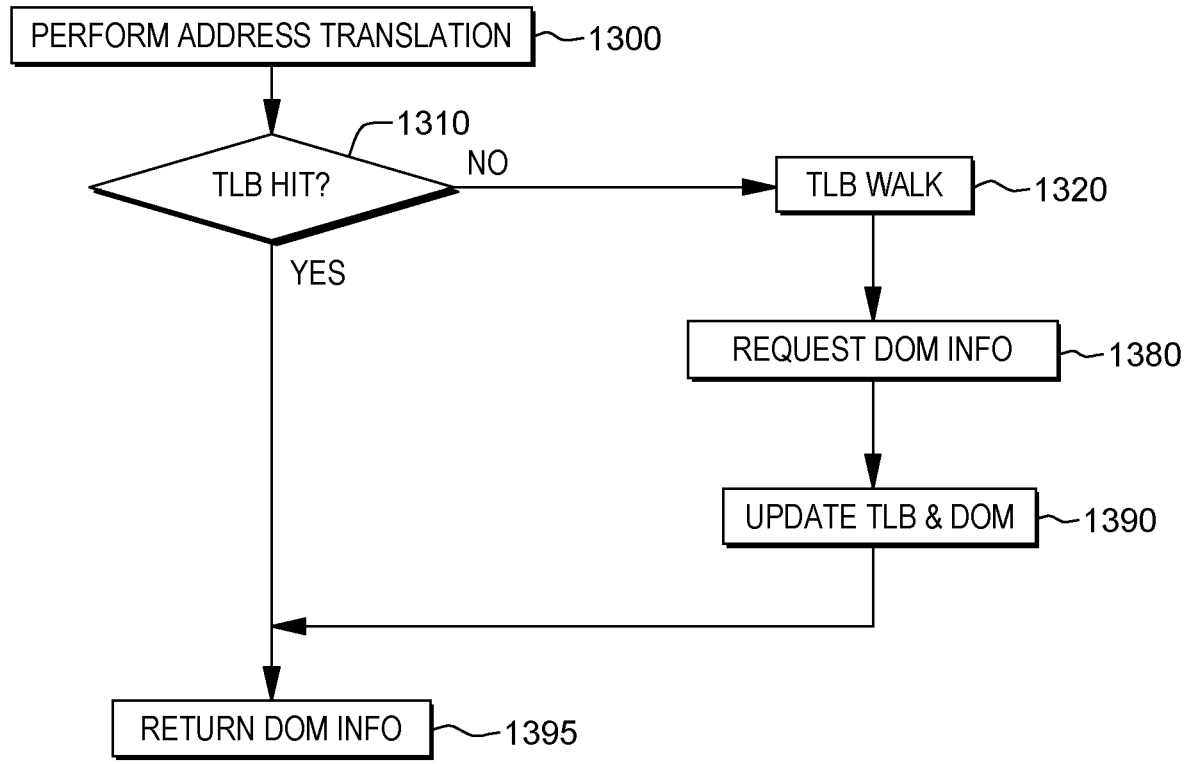
FIG. 13B depicts a further embodiment of the processing of FIG. 13A for accessing memory and managing locality domain information, where there is a TLB miss and the domain information is not currently in the translation lookaside buffer, in accordance with one or more aspects of the present invention.

FIGS. 13A & 13B depict exemplary embodiments for providing or updating the locality domain information of a particular memory unit within a TLB structure. In FIG. 13A, a memory access process is shown which includes, for instance, performing address translation(s) 1300, such as described above, and determining whether there is a TLB hit 1310. If "no", then a TLB "walk" may be performed 1320, as described above. Assuming that there is a TLB hit, then memory may be accessed using, for instance, the config array 1330, and data and config array information may be sent back to the TLB 1340. If there is no locality domain information yet in the TLB for the particular page table entry 1350, then the TLB may be updated with the locality domain information 1360, and the data may be returned 1370.

FIG. 13B depicts one embodiment of a locality domain information request where the information required is not currently in the TLB structure. Address translation is performed 1300, an inquiry is made whether there is a TLB hit 1310. If "yes", then the desired locality domain information is returned 1395. Otherwise, there is a TLB walk 1320, such as described above, and the requested locality domain information is obtained from the system config array 1380. Note that the locality domain information may be disguised, if desired, as a dummy load. The TLB structure (such as shown in FIG. 7C) is updated with the locality domain information 1390, and the information may be returned 1395.

Those skilled in the art will note that various enhancements to the processing discussed herein may be employed. For instance, one or more additional helper functions may be used to identify a range of localities, such as, a memory range. A start of the associated locality domain may be obtained, and all memory locations that fall within the same locality domain may be identified. That is, local ranges of memory may be found, for instance, if desired to find the memory addresses associated with a particular memory chip. In one or more embodiments, large memory regions may be identified such as 1 megabyte or 1 gigabyte pages, so that locality domain information could be obtained or specified for a large number of addresses at once. In this way, processing could avoid testing the locality for the next, for instance, million memory addresses.

Figure 14A:
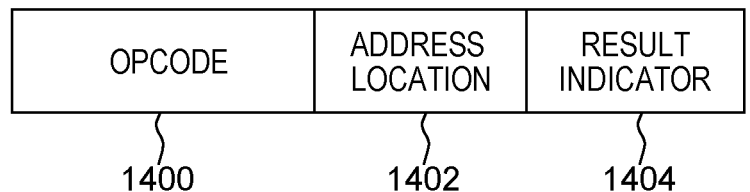
FIG. 14A depicts one embodiment of an is_local_domain instruction, in accordance with one or more aspects of the present invention.

FIG. 14A depicts one embodiment of an is_local_domain instruction, in accordance with one or more aspects of the present invention. As illustrated, the is_local_domain instruction may include, for instance, one or more operation code fields 1400 including an opcode that indicates an is_local_domain operation, as well as, for instance, an address location or memory unit 1402 for a process to determine whether the memory is local, as well as an optional result indicator 1404, which could be a result identifier. In one or more implementations, the result identifier could indicate whether a specified memory unit or address is local to a processing domain, such as a processor, or not local. For instance, the is_local_domain instruction could set a flag to either true or false depending on whether the specified address is within the local domain on a memory channel attached to the local processor, etc., or remote. Note that there may be variance of this instruction that would specify, either as part of the instruction, or as an operand, a locality level, that is, whether the memory is attached to the local processor or is memory attached to one of the processors on the same local board, etc. Further, locality could be specified relative to another structure, such as relative to a system chip, board, etc. Thus, in one or more implementations, the level of proximity may be considered in determining whether there is local affinity to, for instance, a processor.

Figure 14B:
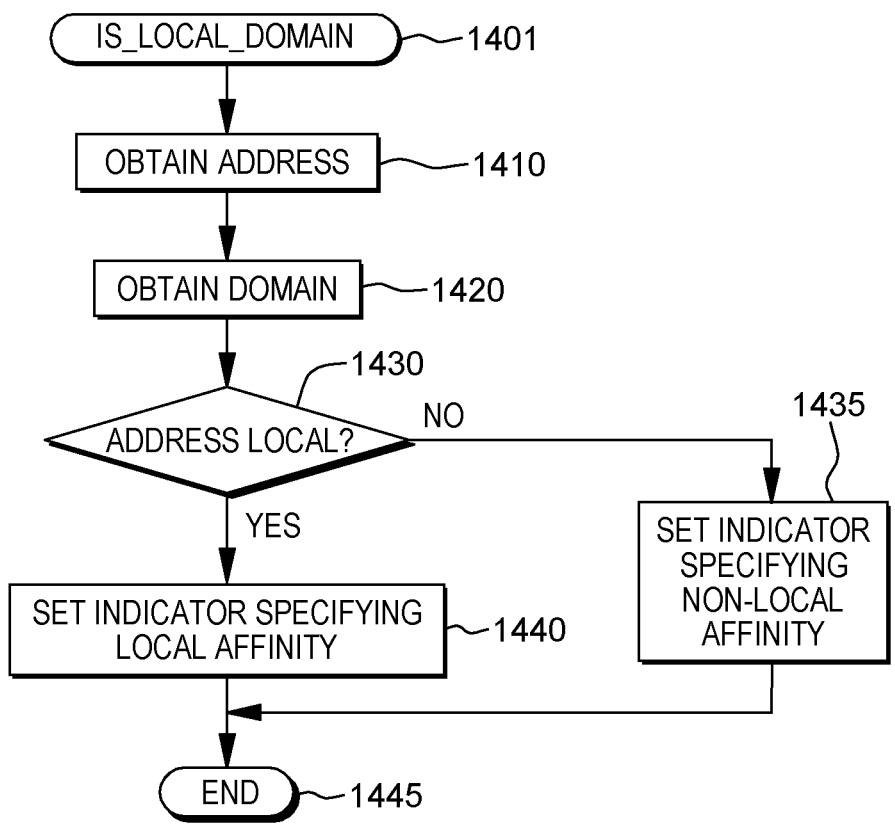
FIG. 14B depicts one embodiment of processing pursuant to an is_local_domain instruction to determine whether a unit of memory, (for instance, to undergo garbage collection) is local to a current processing domain, in accordance with one or more aspects of the present invention.

FIG. 14B depicts one embodiment of processing associated with an is_local_domain instruction. As illustrated in FIG. 14B, the is_local_domain processing 1401 may include obtaining a memory unit or address 1410, as well as obtaining the locality domain for, for instance, a current processor 1420. Processing determines whether the memory unit is local 1430. If "yes", then the result indicator may be set specifying locality affinity 1440, which completes the is_local_domain processing 1445. Otherwise, if the memory unit (or address) is not local 1430 then the result indicator may be set specifying locality affinity 1435, which completes processing.

Note that the result indicator could be, in one or more embodiments, a condition code, or other indicator, such as a flag, to provide information on whether the specified memory unit is local.

In one or more implementations, an optional service function may be provided. For instance, a domain_range or local_domain_range instruction may be provided to provide size of locality domain, for instance, encoding a size that is naturally aligned and can be used in conjunction with a provided address. Also, a domain_start, domain_end, or local_domain_start, local_domain_end, may be provided to facilitate defining the start and end, respectively, of an extended, specified memory range. In one or more embodiments, locality may be defined either in terms of smallest surrounding size or largest known extent having a same locality.

In accordance with one or more further aspects, a capability is provided to create and manage memory pools for use by processing domains, such as hardware processors (or processor threads), to facilitate locality domain-based processing, such as the above-described affinity-domain-based garbage collection processing. The capability is particularly advantageous in a computing environment such as the above-discussed NUMA computing environment.

As noted herein, performing operations on memory local to a specific processor, or more generally, a specific processing domain, advantageously facilitates processing within the computing environment. In fully-virtualized environments, however, there may not be an interface to request memory associated with a specific processing domain. Thus, disclosed herein are approaches to creating memory pools associated with different physical processing domains such that local speed and bandwidth advantages are obtained, even if the processor (or processing domain) cannot request such localized memory from a supervisor, such as from the operating system or hypervisor.

Conventionally, memory allocation occurs from, for instance, a memory heap assigned to an application, and during memory allocation, there is no consideration of the locality of the free memory to a particular processing domain. The memory heap may be a list of free memory that is allocated to any requesting processing domain (e.g., processor), and the next requestor (e.g., processor) may obtain, for instance, the next free memory address from the heap. This can be problematic in a NUMA computing environment where the free memory may be associated with multiple different locality domains within the computing environment, and the next free memory may be associated with a distant locality domain to the current hardware thread (or processor thread) requesting memory. This could be particularly problematic in a multi-threaded application that executes on several processors across multiple locality domains.

Advantageously, memory pools or freelists organized by locality domain are disclosed herein, which allow the application thread requesting memory to be allocated memory local to that thread. Note in this regard, locality may be defined at various levels of the computing environment as explained above. Also, note that the locality domains may be defined at one or more of multiple locality levels within the NUMA computing environment, such as at board local, processor local, thread local, etc. In one or more implementations disclosed herein, processor local allocating is discussed by way of example only.

Advantageously, in one or more aspects, disclosed herein are the creation and use of locality domain-based memory pools, referred to as locality domain-based freelists. In one or more implementations, memory for a memory heap is obtained, and classified by assigning different portions of the memory to corresponding locality domain-based freelists. With the memory portions classified into different freelists by locality domain, then when memory is allocated, memory can be obtained from the locality domain freelist corresponding to the local domain of the requestor (e.g., requesting processor). As explained below, upon memory allocation, the next free memory may optionally be reevaluated to confirm that the locality affinity still exists. If the locality domain has changed, for instance, due to reassignment of the threads of an application executing in a virtualized environment, then the reevaluated memory may be reallocated to another locality domain-based freelist. Also, upon garbage collection compaction, the locality information for the next memory to be processed may optionally be reevaluated to ensure continued locality-based affinity.

Figure 15A:
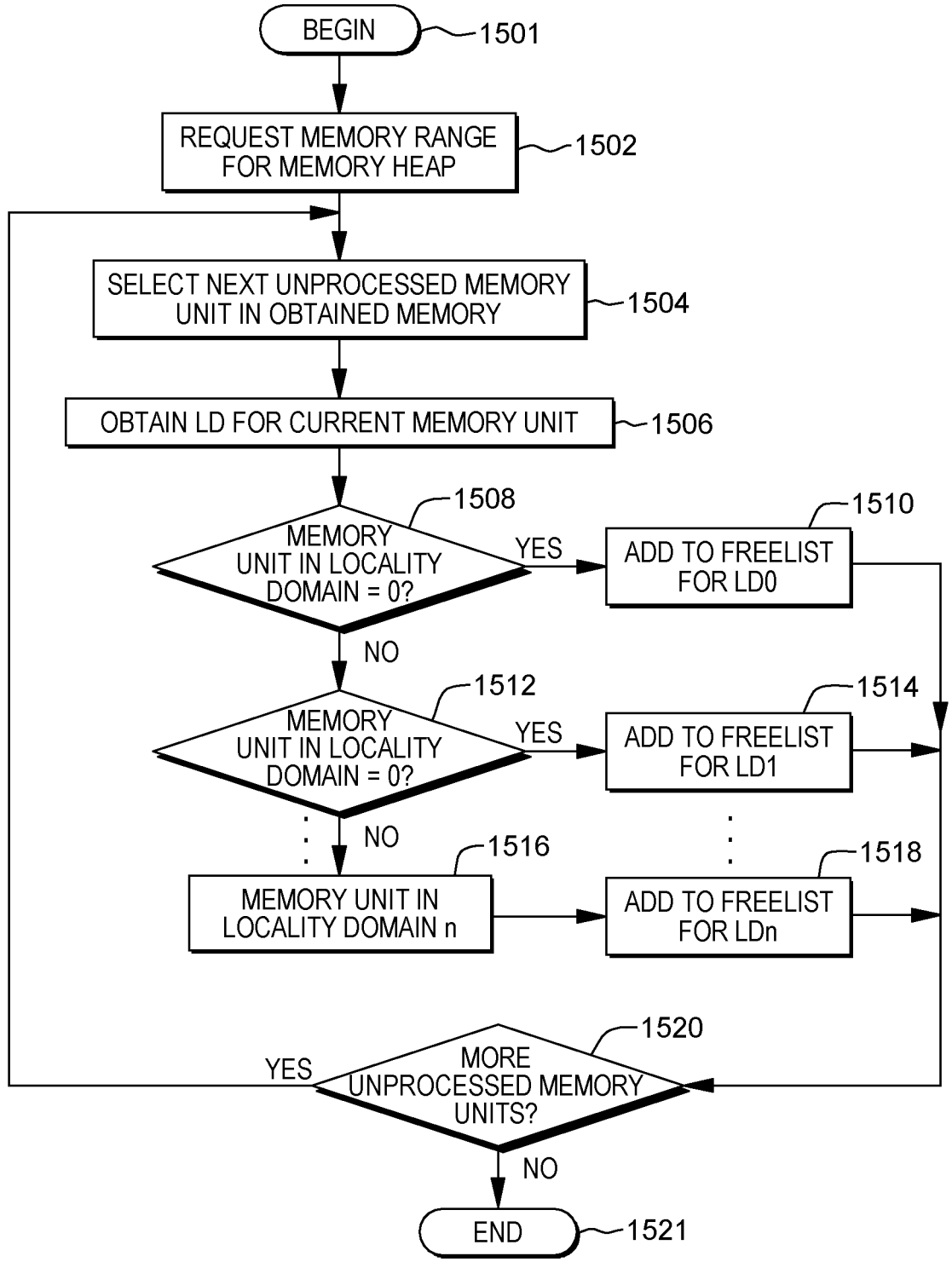
FIG. 15A depicts one embodiment of memory manager initialization processing, in accordance with one or more aspects of the present invention.

FIG. 15A depicts one embodiment of memory manager initialization processing, in accordance with one or more aspects of the present invention. (Note that the processing disclosed herein may be performed by a processor or a component coupled to the processor that is responsible for allocating and deallocating memory (and possibly garbage collecting memory) at the request of an application.) As illustrated, processing begins with a range of memory being requested for a memory heap 1502 of the application. The memory range is divided into memory units, such as pages, objects, addresses, etc. and a next unprocessed memory unit is obtained 1504. The locality domain (LD) for the current memory unit is obtained 1506 using, for instance, the above-discussed load_domain instruction. With locality domains 0 through n (LD0 . . . LDn) defined, processing determines whether the obtained locality domain for the current memory unit is in locality domain 0 (LD0) 1508, and if "yes", adds the memory unit to the freelist for locality domain 0 (LD0) 1510. Otherwise, processing determines whether the locality domain associated with the current memory unit is in locality domain 1 (LD1) 1512, and if so, adds the memory unit to the freelist for locality domain 1 1514. Otherwise, processing continues up to locality domain n (LDn) 1516, where processing assumes that the locality domain matches locality domain n, and adds the memory unit to the freelist for locality domain n 1518. Based on the current memory unit being added to a locality domain, processing determines whether there are more unprocessed memory units 1520, and if "yes", then selects the next unprocessed memory unit from the memory range. Once there are no further unprocessed memory units, this initiation processing is complete 1521.

Figure 15B:
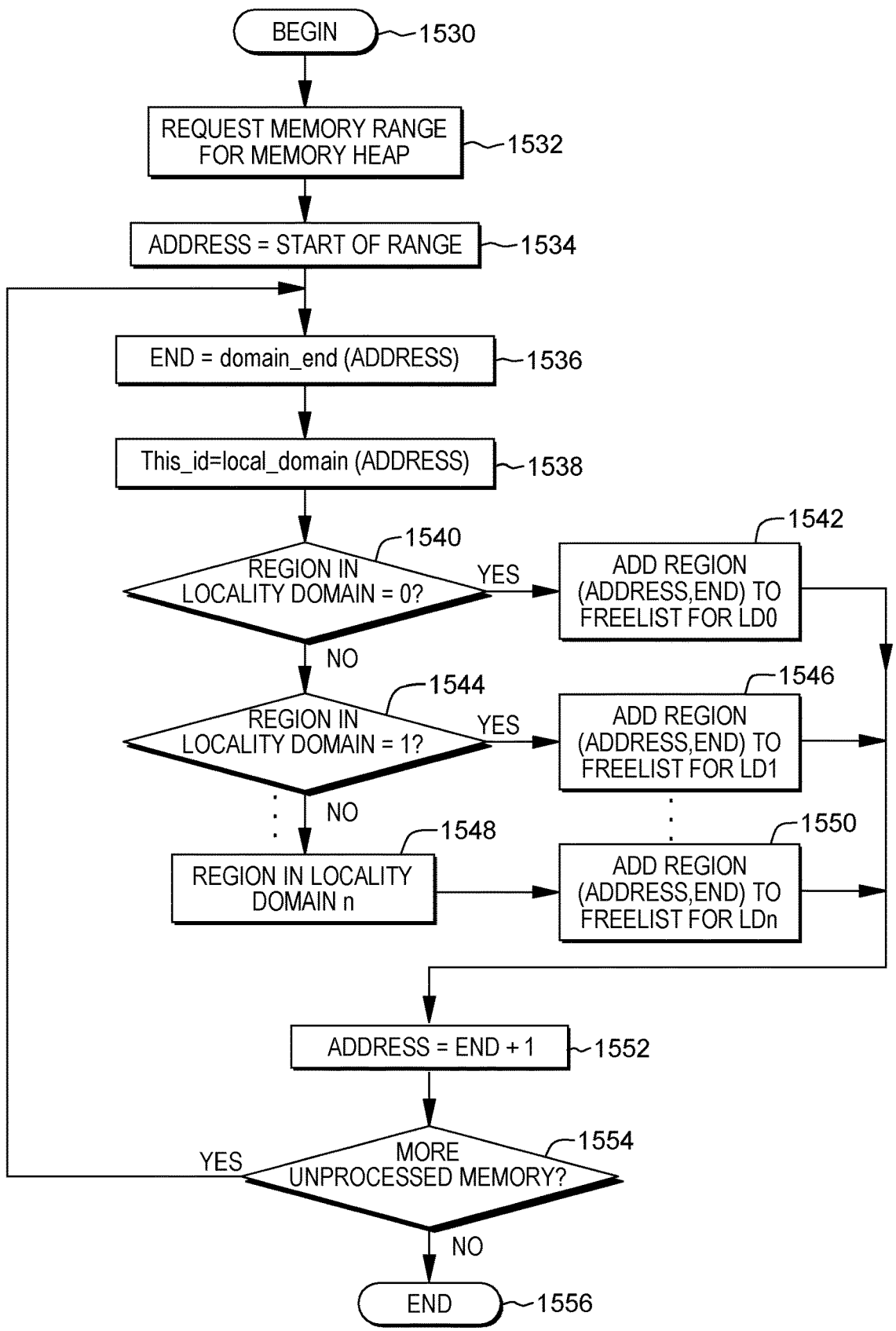
FIG. 15B depicts an alternate embodiment of memory manager initialization processing, in accordance with one or more aspects of the present invention.

In one or more implementations, a single large contiguous memory range may be returned by the operating system, and a variety of sub-regions (that is a variety of sub memory regions) may be obtained corresponding to different locality domains of the computing environment. One embodiment of this is depicted in FIG. 15B. As illustrated, processing begins 1530 with a range of memory being requested for the memory heap 1532. This may include returning an address with a start of the range 1534. An instruction domain_end or domain_range may be utilized to obtain size of a region of the returned range that is in a same locality domain 1536. The locality domain for this particular region may then be identified using, for instance, the above-discussed load_domain instruction 1538. Once the region and locality domain are obtained, processing may determine whether the current memory region is in locality domain 0 1540, and if so, add the region (address, end) to the freelist for locality domain 0 1542. Otherwise, processing determines whether the identified region is in locality domain 1 1544, and if so, adds the region (address, end) to the freelist for locality domain 1 1546. This process continues until locality domain n (LDn) 1548, where the region (address, end) is added to the freelist for locality domain n 1550. Once the region is added to a particular freelist, the address is incremented to the end of the just processed region of memory plus 1 1552, and processing determines whether there are more unprocessed memory regions 1554. If so, processing returns to determine the extent of next region by determining end of the next memory region 1536. Otherwise, based on there being no unprocessed memory remaining, processing is complete 1556. Note that in one or more other embodiments, several large contiguous ranges may be returned, with, for instance, the processing of FIG. 15B performed on each returned range of memory.

In one or more other embodiments, rather than performing, for instance, processing such as described above in connection with FIGS. 15A & 15B, a portion of these methods may be performed during memory allocation to create sufficient memory in a freelist to satisfy a request being presented.

Figure 16:
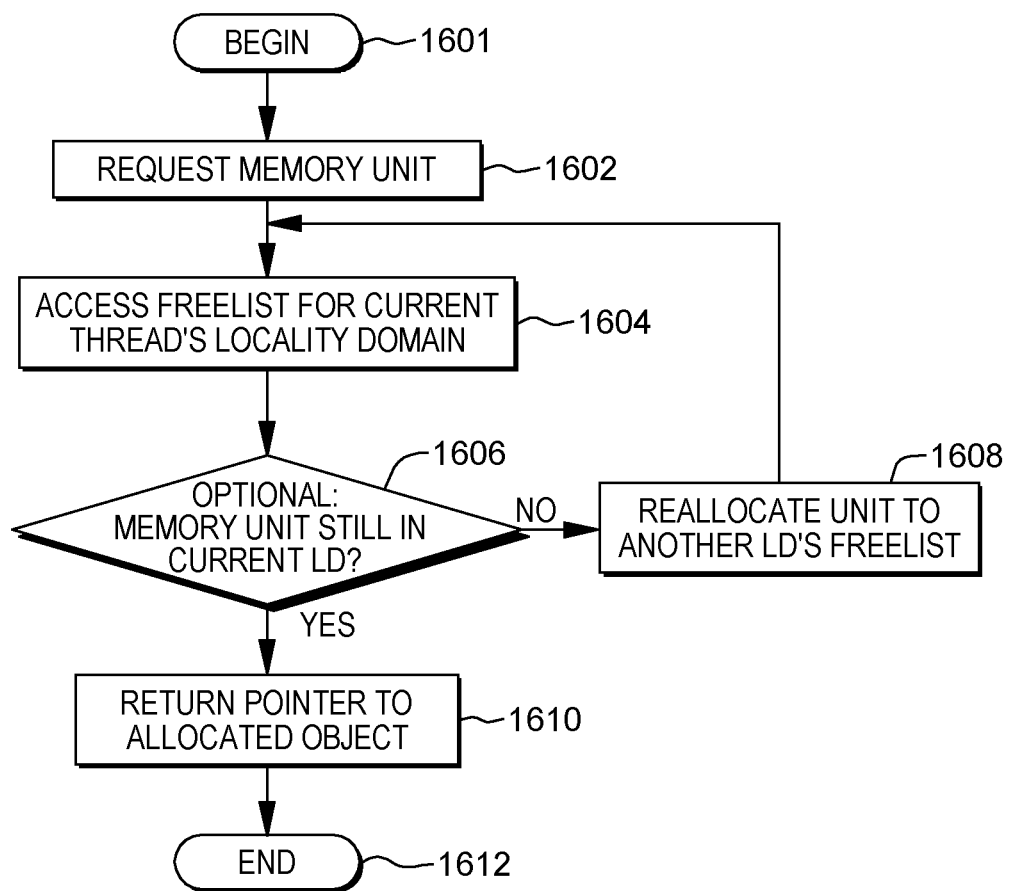
FIG. 16 depicts one embodiment of memory allocation request processing, in accordance with one or more aspects of the present invention.

By way of further example, FIG. 16 depicts one embodiment of memory allocation request processing once memory units have been assigned to respective locality domain-based freelists, such as described above. As illustrated, memory allocation 1601 may include requesting a memory unit (e.g., object, page, etc.) 1602, and accessing a freelist for the current processor thread's locality domain 1604. Optionally, the returned memory unit may be evaluated to determine that it is still in the locality domain of the current processor thread 1606. For instance, the load_domain instruction described above may be utilized for the memory unit obtained from the freelist, with the result being compared to the local thread's locality domain. In another embodiment, this may be performed using an is_local_domain instruction, such as described above. If the memory unit is no longer in the locality domain of the current processor, then the memory unit may be reallocated to another locality domain's freelist to which the memory unit currently corresponds 1608. Once reallocated, processing may obtain from the associated freelist of the current processor thread a next memory unit. Once a memory unit in the current locality domain is obtained, the memory object is allocated to the caller and the pointer to the allocated object may be returned to the caller 1610, which completes allocation process 1612. Note that in accordance with this processing, memory requests may be allocated to the locality domains of the processes or tasks requesting the allocation of memory in accordance with existing memory allocation interfaces, thereby ensuring compatibility with existing source code. In another embodiment, a locality domain may be specified in the allocation request in accordance with an allocation interface of the present invention, with the memory unit(s) being selected from the corresponding locality domain-based freelist(s).

Figure 17:
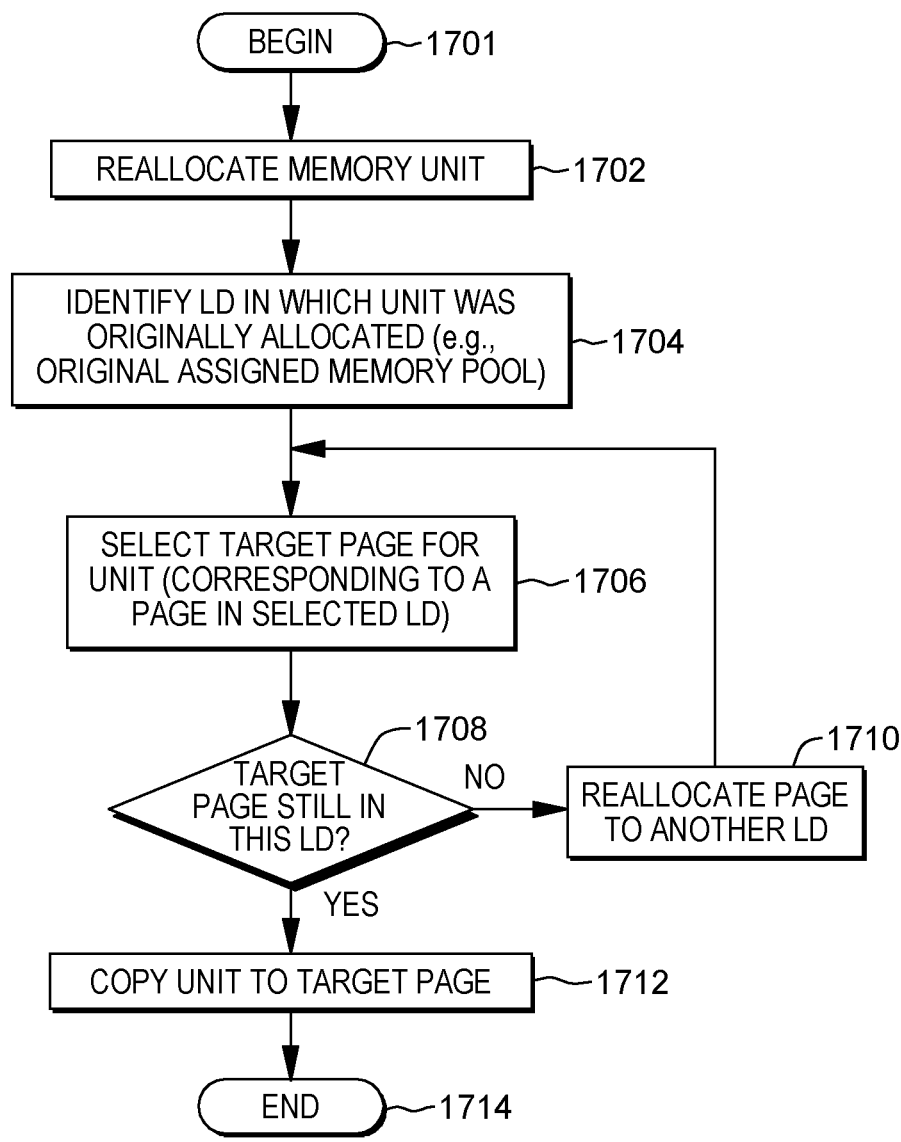
FIG. 17 depicts one embodiment of memory compaction related processing associated with, for instance, garbage collection processing, in accordance with one or more aspects of the present invention.

In accordance with one or more further aspects, locality of memory units may be reevaluated or reestablished during, for instance, garbage collection processing, and in particular, in association with memory compaction by the memory manager. FIG. 17 depicts one embodiment of such a reevaluation processing. Memory compaction beings 1701 with relocating a memory unit 1702 and identifying the locality domain in which the memory unit was originally allocated (e.g., original assigned locality domain-based freelist) of the virtual environment 1704. A target page for the memory unit (corresponding to a page in the selected locality domain) is selected 1706, and processing determines whether the target page is still in this locality domain 1708. If "no", then the target page may be reallocated to another locality domain, that is, another locality domain freelist with which the page is associated 1710. Note in this regard that the load_domain instruction may be used for the memory region obtained from the freelist, and comparing that to the local processor's (or thread's) locality domain. In another embodiment, this may be performed using the is_local_domain instruction discussed above. Once the locality domain is confirmed, the memory unit may be copied to the target page 1712, which completes processing for the relocated memory unit 1714. Note that this process may be performed for each relocated memory unit (e.g., object).

In one or more other implementations, as part of the memory compaction processing or in associated therewith, the memory region affinity need not necessarily be based on the original locality based allocation. Rather, locality affinity may be based in this context on, for instance, repeated accesses to a memory unit. For instance, if the memory unit is repeatedly accessed by a particular processor in a particular locality domain, then even though the original allocation was to a different processing domain, then it may be desirable to allocate the memory unit to the particular processing domain from which the repeated accesses occur. Thus, the memory unit (object, buffer, etc.) may be moved to a page that is in the locality domain of that processor (or processing domain) repeatedly accessing the range. In this way, the "locality" may be the most desirable locality affinity based on actual processing. Thus, rather than making an inquiry as to what was the original locality assignment, a decision may be made as to what is the best locality in order to optimize affinity of the memory to the different processing domains for a particular application. Note also that, as noted above, locality may be hierarchical, and assignment of memory may be performed at any or several of the hierarchy levels. Thus, in one embodiment, memory compaction may choose to place objects local relative to the book level without regard to the individual processors.

Figure 18:
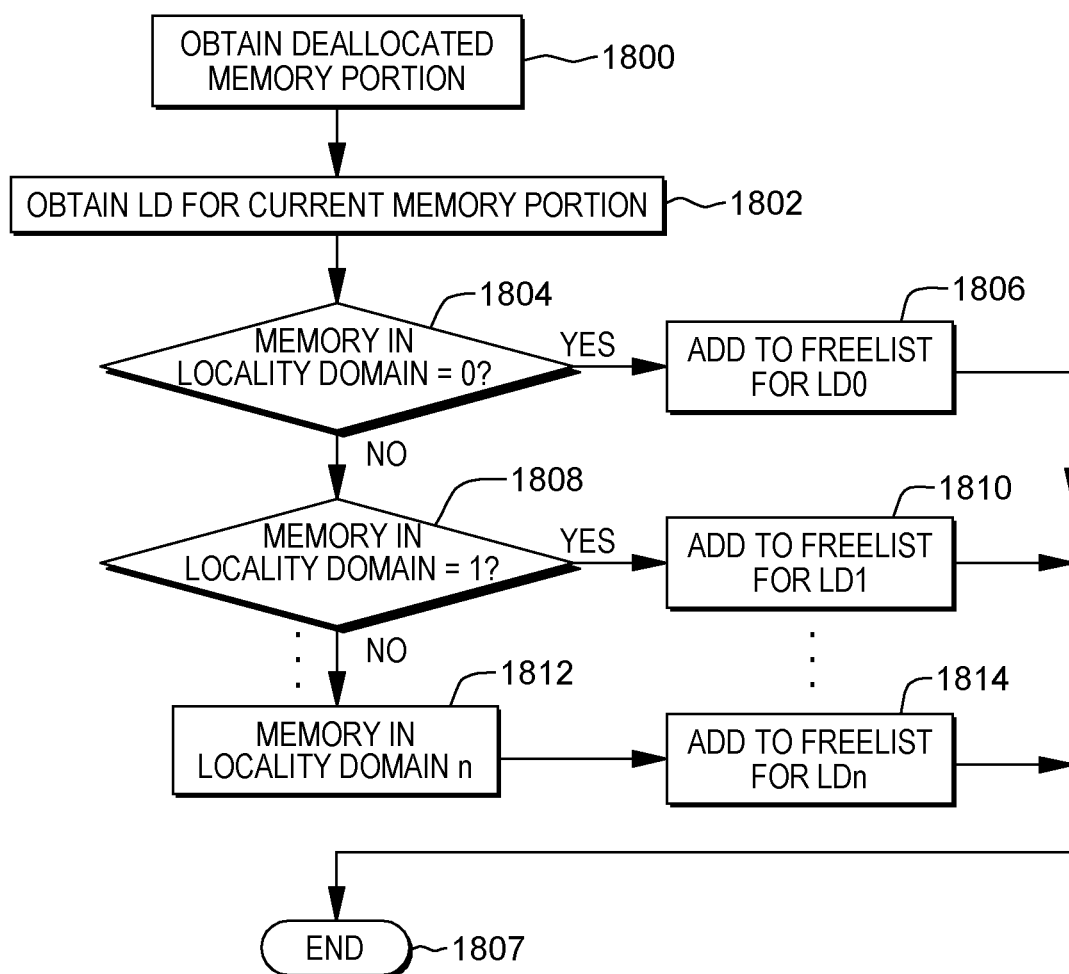
FIG. 18 depicts one embodiment of memory deallocation related processing, in accordance with one or more aspects of the present invention.

FIG. 18 depicts one embodiment of processing which may be performed in association with memory deallocation, in accordance with one or more aspects of the present invention. This processing may be performed for each deallocated memory portion (or entity), such as a page, object, address range, etc. Memory deallocation may be performed either responsive to a direct memory deallocation request (e.g., the free( ) call in accordance with the POSIX standard specification), or responsive to memory being deallocated responsive to garbage collection. A deallocated memory portion is obtained 1800, and locality domain for the current memory portion is ascertained 1802 using, for instance, the above-noted load_domain instruction. Once the locality domain is obtained for the deallocated memory portion, processing determines whether the memory is in locality domain 0 1804, and if so, adds the memory to the corresponding domain freelist for locality domain 0 1806. Otherwise, processing determines whether the memory is in locality domain 1 1808, and if so, adds the memory to the freelist for locality domain 1 1810. This process continues until locality domain n where it is assumed that the memory is in locality domain n 1812, and the memory is added to the freelist for locality domain n 1814, which completes processing 1807 of the deallocated memory.

One or more aspects of the present invention are inextricably tied to the computer technology and facilitate processing within a computer, and improving performance thereof. Further details of one embodiment of facilitating processing within a computing environment, as it relates to one or more aspects of the present invention, are described with reference to FIGS. 19A-19B.

Figure 19A:
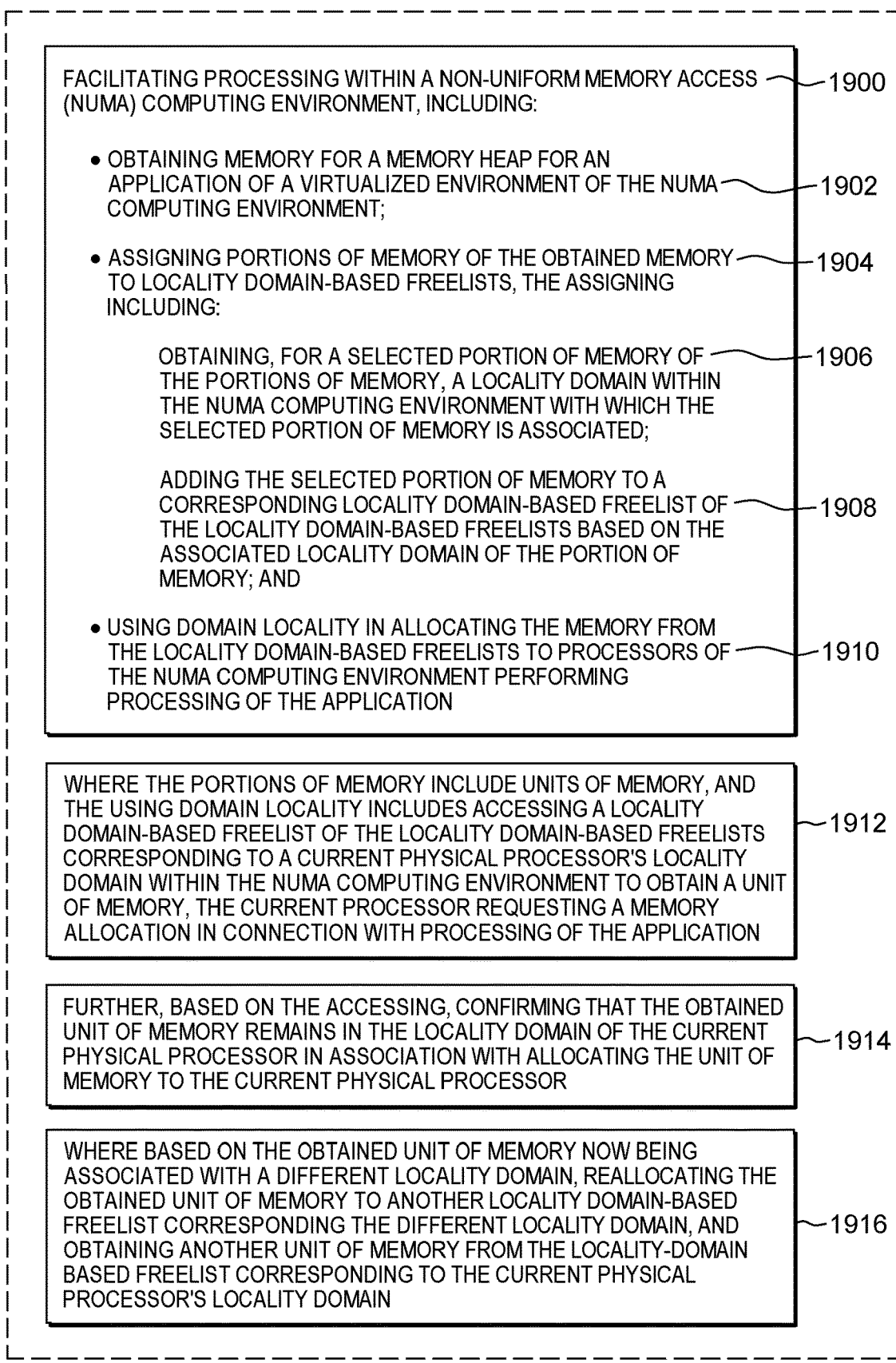

Referring to FIG. 19A, in one embodiment, processing within a non-uniform memory access (NUMA) computing environment is facilitated (1900). The processing includes obtaining memory for a memory heap for an application of a virtualized environment of the NUMA computing environment (1902), and assigning portions of memory of the obtained memory to the locality domain-based freelists (1904). The assigning includes obtaining, for a selected portion of memory of the portions of memory, a locality domain within the NUMA computing environment with which the selected portion of memory is associated (1906), and adding the selected portion of memory to a corresponding locality domain-based freelist of the locality domain-based freelists based on the associated locality domain of the portion of memory (1908). Further, the process includes using domain locality in allocating the memory from the locality domain-based freelists to processors of the NUMA computing environment performing processing of the application (1910).

In one or more embodiments, the portions of memory include units of memory, and the using domain locality includes accessing a locality domain-based freelist of the locality domain-based freelists corresponding to a current physical processor's locality domain within the NUMA computing environment to obtain a unit of memory, the current processor requesting a memory allocation in connection with processing of the application (1912). Further, based on the accessing, the process includes confirming that the obtained unit of memory remains in the locality domain of the current physical processor in association with allocating the unit of memory to the current physical processor (1914). In one or more implementations, where, based on the obtained unit of memory now being associated with a different locality domain, the process includes reallocating the obtained unit of memory to another locality domain-based freelist corresponding to the different locality domain, and obtaining another unit of memory from the locality domain-based freelist corresponding to the current physical processor's locality domain (1916).

As illustrated in FIG. 19B, in one or more embodiments, the units of memory are memory pages (1918). In one or more embodiments, the obtaining memory includes receiving a virtualized memory range for the memory heap and separating the virtualized memory range into the portions of memory based on the locality domains within the NUMA computing environment with which the portions of memory are associated, the associated locality domains being obtained via, in part, address translation (1920). In one or more implementations, the portions of memory include units of memory, and the method further includes: performing garbage collection processing within the NUMA computing environment, the garbage collection processing including performing memory compaction; and determining after the memory compaction a locality domain within the NUMA computing environment with which a unit of memory of the units of memory is associated (1922). In one or more embodiments, the determining includes ascertaining the locality domain within the NUMA computing environment with which the unit of memory is now associated, and adding that unit of memory to the corresponding locality domain-based freelist (1924). In one or more embodiments, the determining includes ascertaining a locality domain within the NUMA computing environment from which the unit of memory is most accessed and adding that unit of memory to the corresponding locality domain-based freelist of that domain (1926).

In one or more implementations, the process further includes, in association with deallocating a portion of memory, obtaining for the deallocated portion of memory the locality domain within the NUMA computing environment with which the deallocated portion of memory is associated, and adding the deallocated portion of memory to the corresponding locality domain-based freelist (1928).

Many variations are possible without departing from the spirit of aspects of the present invention.

Figure 20A:
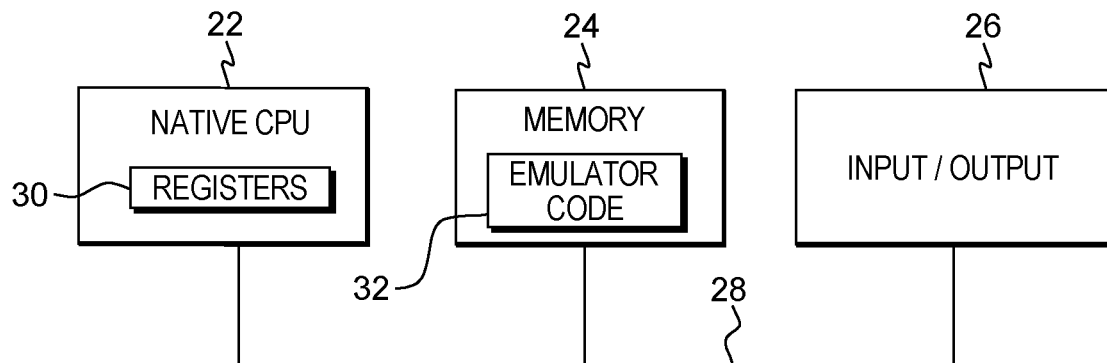
FIG. 20A depicts another example of a computing environment to incorporate and use one or more aspects of the present invention.

Other types of computing environments may also incorporate and use one or more aspects of the present invention, including, but not limited to, emulation environments, an example of which is described with reference to FIG. 20A. In this example, a computing environment 20 includes, for instance, a native central processing unit (CPU) 22, a memory 24, and one or more input/output devices and/or interfaces 26 coupled to one another via, for example, one or more buses 28 and/or other connections. As examples, computing environment 20 may include a PowerPC processor or a pSeries server offered by International Business Machines Corporation, Armonk, N.Y.; and/or other machines based on architectures offered by International Business Machines Corporation, Intel, or other companies.

Native central processing unit 22 includes one or more native registers 30, such as one or more general purpose registers and/or one or more special purpose registers used during processing within the environment. These registers include information that represents the state of the environment at any particular point in time.

Moreover, native central processing unit 22 executes instructions and code that are stored in memory 24. In one particular example, the central processing unit executes emulator code 32 stored in memory 24. This code enables the computing environment configured in one architecture to emulate another architecture. For instance, emulator code 32 allows machines based on architectures other than the z/Architecture, such as PowerPC processors, pSeries servers, or other servers or processors, to emulate the z/Architecture and to execute software and instructions developed based on the z/Architecture.

Figure 20B:
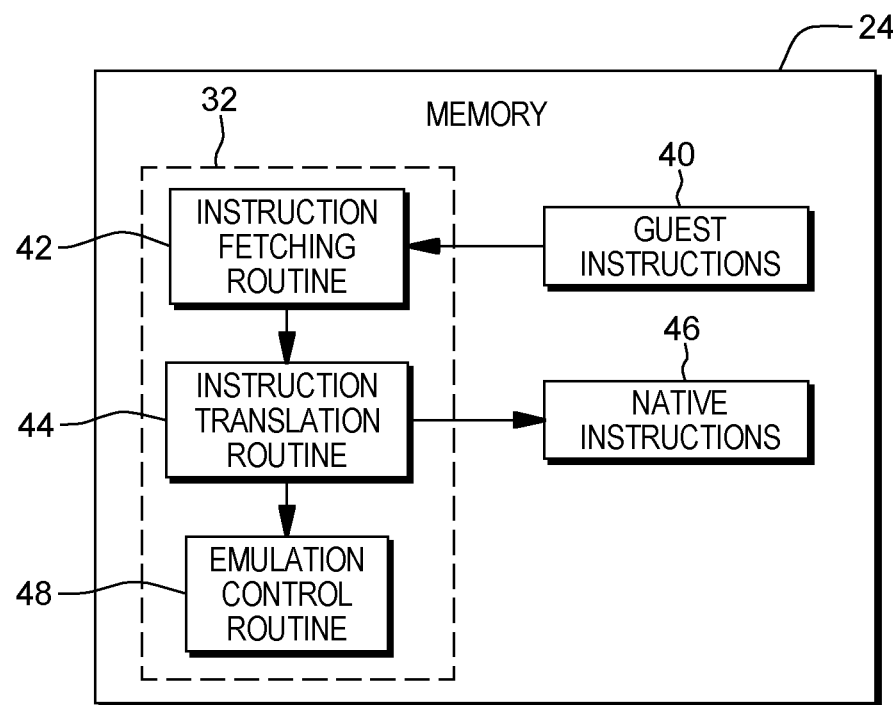
FIG. 20B depicts further details of the memory of FIG. 20A.

Further details relating to emulator code 32 are described with reference to FIG. 20B. Guest instructions 40 stored in memory 24 comprise software instructions (e.g., correlating to machine instructions) that were developed to be executed in an architecture other than that of native CPU 22. For example, guest instructions 40 may have been designed to execute on a z/Architecture processor, but instead, are being emulated on native CPU 22, which may be, for example, an Intel processor. In one example, emulator code 32 includes an instruction fetching routine 42 to obtain one or more guest instructions 40 from memory 24, and to optionally provide local buffering for the instructions obtained. It also includes an instruction translation routine 44 to determine the type of guest instruction that has been obtained and to translate the guest instruction into one or more corresponding native instructions 46. This translation includes, for instance, identifying the function to be performed by the guest instruction and choosing the native instruction(s) to perform that function.

Further, emulator code 32 includes an emulation control routine 48 to cause the native instructions to be executed. Emulation control routine 48 may cause native CPU 22 to execute a routine of native instructions that emulate one or more previously obtained guest instructions and, at the conclusion of such execution, return control to the instruction fetch routine to emulate the obtaining of the next guest instruction or a group of guest instructions. Execution of native instructions 46 may include loading data into a register from memory 24; storing data back to memory from a register; or performing some type of arithmetic or logic operation, as determined by the translation routine.

Each routine is, for instance, implemented in software, which is stored in memory and executed by native central processing unit 22. In other examples, one or more of the routines or operations are implemented in firmware, hardware, software or some combination thereof. The registers of the emulated processor may be emulated using registers 30 of the native CPU or by using locations in memory 24. In embodiments, guest instructions 40, native instructions 46 and emulator code 32 may reside in the same memory or may be disbursed among different memory devices.

As used herein, firmware includes, e.g., the microcode or Millicode of the processor. It includes, for instance, the hardware-level instructions and/or data structures used in implementation of higher level machine code. In one embodiment, it includes, for instance, proprietary code that is typically delivered as microcode that includes trusted software or microcode specific to the underlying hardware and controls operating system access to the system hardware.

A guest instruction 40 that is obtained, translated and executed may be, for instance, one of the instructions described herein. The instruction, which is of one architecture (e.g., the z/Architecture), is fetched from memory, translated and represented as a sequence of native instructions 46 of another architecture (e.g., PowerPC, pSeries, Intel, etc.). These native instructions are then executed.

One or more aspects may relate to cloud computing.

It is understood in advance that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g. networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based email). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for loadbalancing between clouds).

A cloud computing environment is service oriented with a focus on statelessness, low coupling, modularity, and semantic interoperability. At the heart of cloud computing is an infrastructure comprising a network of interconnected nodes.

Figure 21:
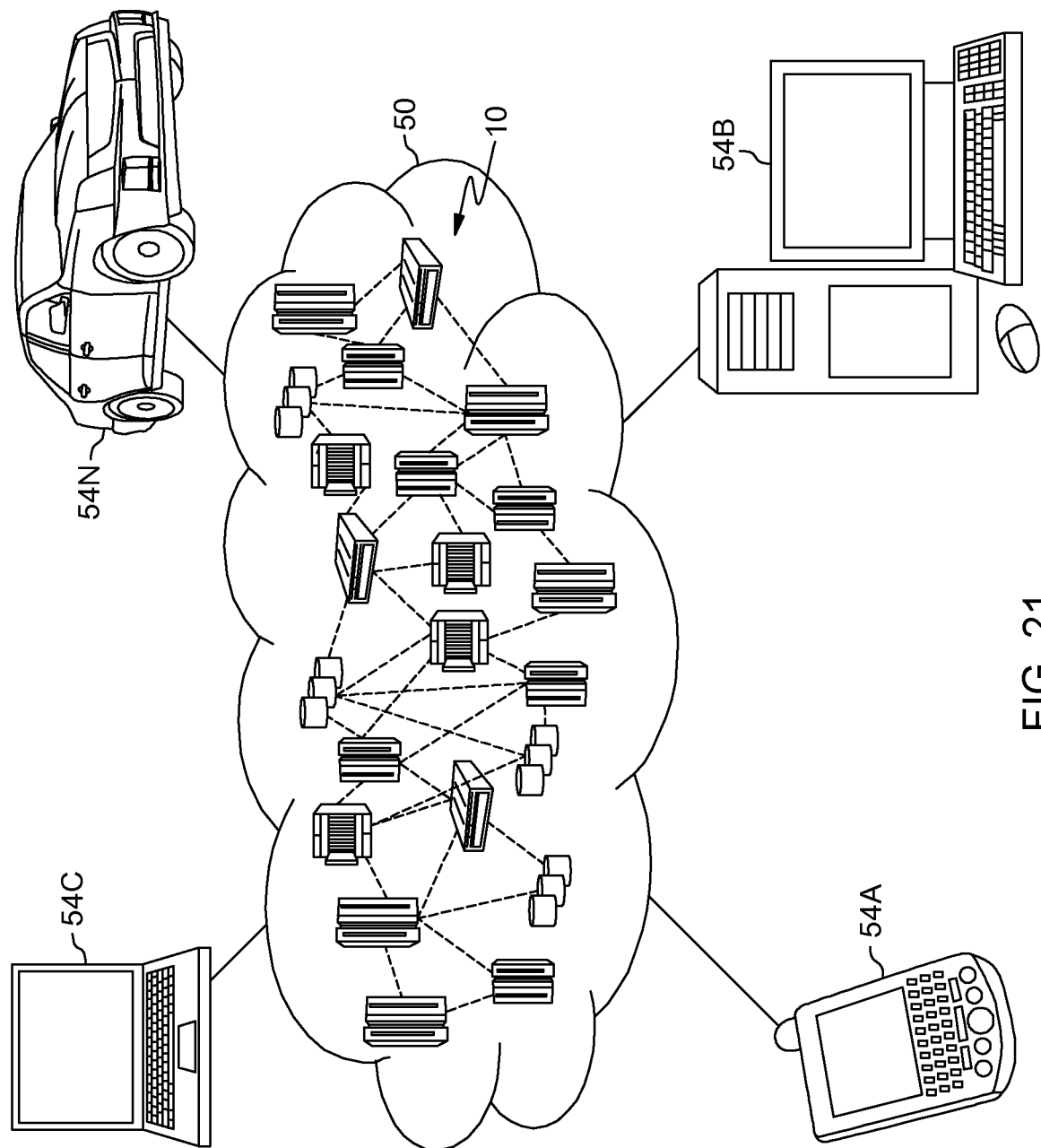
FIG. 21 depicts one embodiment of a cloud computing environment.

Referring now to FIG. 21, illustrative cloud computing environment 50 is depicted. As shown, cloud computing environment 50 comprises one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 21 are intended to be illustrative only and that computing nodes 10 and cloud computing environment 50 can communicate with any type of computerized device over any type of network and/or network addressable connection (e.g., using a web browser).

Figure 22:
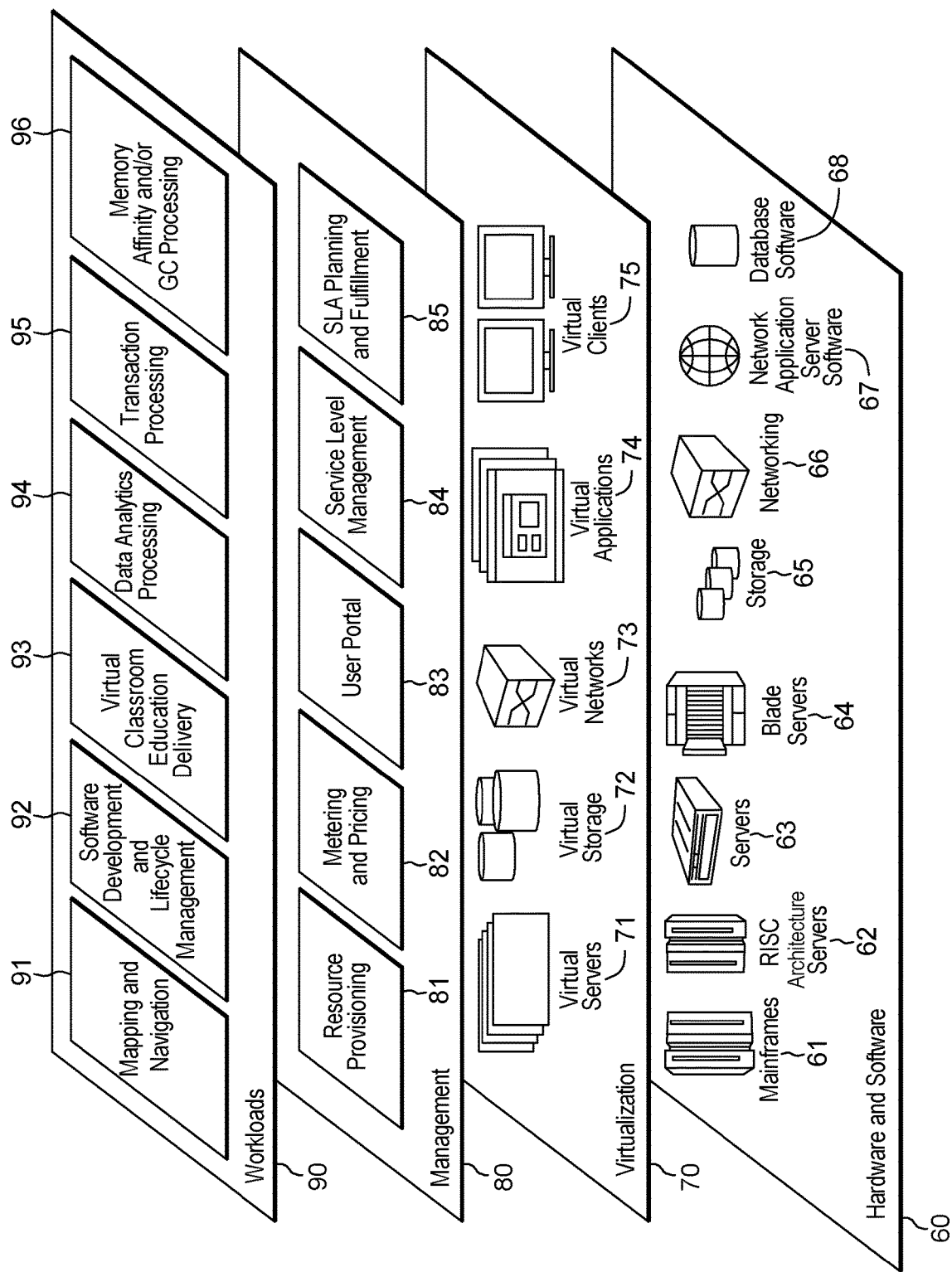
FIG. 22 depicts an example of abstraction model layers.

Referring now to FIG. 22, a set of functional abstraction layers provided by cloud computing environment 50 (FIG. 21) is shown. It should be understood in advance that the components, layers, and functions shown in FIG. 22 are intended to be illustrative only and embodiments of the invention are not limited thereto. As depicted, the following layers and corresponding functions are provided:

Hardware and software layer 60 includes hardware and software components. Examples of hardware components include mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may comprise application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and memory affinity and/or garbage collection processing 96.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition to the above, one or more aspects may be provided, offered, deployed, managed, serviced, etc. by a service provider who offers management of customer environments. For instance, the service provider can create, maintain, support, etc. computer code and/or a computer infrastructure that performs one or more aspects for one or more customers. In return, the service provider may receive payment from the customer under a subscription and/or fee agreement, as examples. Additionally or alternatively, the service provider may receive payment from the sale of advertising content to one or more third parties.

In one aspect, an application may be deployed for performing one or more embodiments. As one example, the deploying of an application comprises providing computer infrastructure operable to perform one or more embodiments.

As a further aspect, a computing infrastructure may be deployed comprising integrating computer readable code into a computing system, in which the code in combination with the computing system is capable of performing one or more embodiments.

As yet a further aspect, a process for integrating computing infrastructure comprising integrating computer readable code into a computer system may be provided. The computer system comprises a computer readable medium, in which the computer medium comprises one or more embodiments. The code in combination with the computer system is capable of performing one or more embodiments.

Although various embodiments are described above, these are only examples. For example, computing environments of other architectures can be used to incorporate and use one or more embodiments. Further, different memory and/or cache hierarchies may be used. Many variations are possible.

Further, other types of computing environments can benefit and be used. As an example, a data processing system suitable for storing and/or executing program code is usable that includes at least two processors coupled directly or indirectly to memory elements through a system bus. The memory elements include, for instance, local memory employed during actual execution of the program code, bulk storage, and cache memory which provide temporary storage of at least some program code in order to reduce the number of times code must be retrieved from bulk storage during execution.

Input/Output or I/O devices (including, but not limited to, keyboards, displays, pointing devices, DASD, tape, CDs, DVDs, thumb drives and other memory media, etc.) can be coupled to the system either directly or through intervening I/O controllers. Network adapters may also be coupled to the system to enable the data processing system to become coupled to other data processing systems or remote printers or storage devices through intervening private or public networks. Modems, cable modems, and Ethernet cards are just a few of the available types of network adapters.

The terminology used herein is for the purpose of describing particular embodiments only and is not intended to be limiting. As used herein, the singular forms "a", "an" and "the" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components and/or groups thereof.

The corresponding structures, materials, acts, and equivalents of all means or step plus function elements in the claims below, if any, are intended to include any structure, material, or act for performing the function in combination with other claimed elements as specifically claimed. The description of one or more embodiments has been presented for purposes of illustration and description, but is not intended to be exhaustive or limited to in the form disclosed. Many modifications and variations will be apparent to those of ordinary skill in the art. The embodiment was chosen and described in order to best explain various aspects and the practical application, and to enable others of ordinary skill in the art to understand various embodiments with various modifications as are suited to the particular use contemplated.

What is claimed is:

1. A computer program product for facilitating processing within a non-uniform memory access (NUMA) computing environment, the computer program product comprising:
   a computer readable storage medium readable by a processing circuit and storing instructions which, when executed, perform a method comprising:
      obtaining memory for a memory heap for an application of a virtualized environment of the NUMA computing environment;
      assigning portions of memory of the obtained memory to locality domain-based freelists, the assigning comprising:
         obtaining, for a selected portion of memory of the portions of memory, a locality domain within the NUMA computing environment with which the selected portion of memory is associated, the obtaining comprising ascertaining a locality domain within the NUMA computing environment from which the unit of memory is most accessed;
         adding the selected portion of memory to a corresponding locality domain-based freelist of the ascertained locality domain from which the unit of memory is most accessed, the corresponding locality domain-based freelist being one locality domain-based freelist of the locality domain-based freelists; and
      using domain locality in allocating the memory from the locality domain-based freelists to processors of the NUMA computing environment performing processing of the application.

2. The computer program product of claim 1, wherein the portions of memory comprise units of memory, and the using domain locality comprises accessing a locality domain-based freelist of the locality domain-based freelists corresponding to a current physical processor's locality domain within the NUMA computing environment to obtain a unit of memory, the current processor requesting a memory allocation in connection with processing of the application.

3. The computer program product of claim 2, further comprising, based on the accessing, confirming that the obtained unit of memory remains in the locality domain of the current physical processor in association with allocating the unit of memory to the current physical processor.

4. The computer program product of claim 3, wherein based on the obtained unit of memory now being associated with a different locality domain, reallocating the obtained unit of memory to another locality domain-based freelist corresponding the different locality domain, and obtaining another unit of memory from the locality-domain based freelist corresponding to the current physical processor's locality domain.

5. The computer program product of claim 2, wherein the units of memory are memory pages.

6. The computer program product of claim 1, wherein the obtaining memory comprises receiving a virtualized memory range for the memory heap and separating the virtualized memory range into the portions of memory based on locality domains within the NUMA computing environment with which the portions of memory are associated.

7. The computer program product of claim 1, wherein the portions of memory comprise units of memory, and the method further comprises:
   performing garbage collection processing within the NUMA computing environment, the garbage collection processing including performing memory compaction; and
   determining after the memory compaction a locality domain within the NUMA computing environment with which a unit of memory of the units of memory is associated.

8. The computer program product of claim 7, wherein the determining comprises ascertaining the locality domain within the NUMA computing environment with which the unit of memory is now associated, and adding that unit of memory to the corresponding locality domain-based freelist.

9. The computer program product of claim 1, further comprising, in association with deallocating a portion of memory, obtaining for the deallocated portion of memory the locality domain within the NUMA computing environment with which the deallocated portion of memory is associated, and adding the deallocated portion of memory to the corresponding locality domain-based freelist.

10. A computer system for facilitating processing within a computing environment, the computer system comprising:
    a memory; and
    a processor in communications with a memory, wherein the computer system is configured to perform a method, the method comprising:
       obtaining memory for a memory heap for an application of a virtualized environment of the NUMA computing environment;
       assigning portions of memory of the obtained memory to locality domain-based freelists, the assigning comprising:

obtaining, for a selected portion of memory of the portions of memory, a locality domain within the NUMA computing environment with which the selected portion of memory is associated, the obtaining comprising ascertaining a locality domain within the NUMA computing environment from which the unit of memory is most accessed;

adding the selected portion of memory to a corresponding locality domain-based freelist of the ascertained locality domain from which the unit of memory is most accessed, the corresponding locality domain-based freelist being one locality domain-based freelist of the locality domain-based freelists; and using domain locality in allocating the memory from the locality domain-based freelists to processors of the NUMA computing environment performing processing of the application.

11. The computer system of claim 10, wherein the portions of memory comprise units of memory, and the using domain locality comprises accessing a locality domain-based freelist of the locality domain-based freelists corresponding to a current physical processor's locality domain within the NUMA computing environment to obtain a unit of memory, the current processor requesting a memory allocation in connection with processing of the application.

12. The computer system of claim 11, further comprising, based on the accessing, confirming that the obtained unit of memory remains in the locality domain of the current physical processor in association with allocating the unit of memory to the current physical processor.

13. The computer system of claim 10, wherein the obtaining memory comprises receiving a virtualized memory range for the memory heap and separating the virtualized memory range into the portions of memory based on locality domains within the NUMA computing environment with which the portions of memory are associated.

14. The computer system of claim 10, wherein the portions of memory comprise units of memory, and the method further comprises:

performing garbage collection processing within the NUMA computing environment, the garbage collection processing including performing memory compaction; and determining after the memory compaction a locality domain within the NUMA computing environment with which a unit of memory of the units of memory is associated.

15. The computer system of claim 10, further comprising, in association with deallocating a portion of memory, obtaining for the deallocated portion of memory the locality domain within the NUMA computing environment with which the deallocated portion of memory is associated, and adding the deallocated portion of memory to the corresponding locality domain-based freelist.

16. A computer-implemented method of facilitating processing within a computing environment, the computer-implemented method comprising:

obtaining memory for a memory heap for an application of a virtualized environment of the NUMA computing environment;

assigning portions of memory of the obtained memory to locality domain-based freelists, the assigning comprising:

obtaining, for a selected portion of memory of the portions of memory, a locality domain within the NUMA computing environment with which the selected portion of memory is associated, the obtaining comprising ascertaining a locality domain within the NUMA computing environment from which the unit of memory is most accessed;

adding the selected portion of memory to a corresponding locality domain-based freelist of the ascertained locality domain from which the unit of memory is most accessed, the corresponding locality domain-based freelist being one locality domain-based freelist of the locality domain-based freelists; and using domain locality in allocating the memory from the locality domain-based freelists to processors of the NUMA computing environment performing processing of the application.

17. The computer-implemented method of claim 16, wherein the portions of memory comprise units of memory, and the using domain locality comprises accessing a locality domain-based freelist of the locality domain-based freelists corresponding to a current physical processor's locality domain within the NUMA computing environment to obtain a unit of memory, the current processor requesting a memory allocation in connection with processing of the application.

18. The computer-implemented method of claim 17, further comprising, based on the accessing, confirming that the obtained unit of memory remains in the locality domain of the current physical processor in association with allocating the unit of memory to the current physical processor.

19. The computer-implemented method of claim 16, wherein the obtaining memory comprises receiving a virtualized memory range for the memory heap and separating the virtualized memory range into the portions of memory based on locality domains within the NUMA computing environment with which the portions of memory are associated.

* * * * *